US012452282B2

(12) United States Patent
Jones et al.

(10) Patent No.: US 12,452,282 B2
(45) Date of Patent: Oct. 21, 2025

(54) ACCESS PREDICTION SERVICE SERVING EXPLAINABLE RISK SCORES

(71) Applicant: Ping Identity International, Inc., Denver, CO (US)

(72) Inventors: Darryl Jones, Princeton, NJ (US); Raminder Deep Singh Kaler, Redwood City, CA (US); Peter Barker, Austin, TX (US); Sudhakar Peddibhotla, Seattle, WA (US)

(73) Assignee: Ping Identity International, Inc., Denver, CO (US)

( * ) Notice: Subject to any disclaimer, the term of this patent is extended or adjusted under 35 U.S.C. 154(b) by 129 days.

(21) Appl. No.: 18/139,296

(22) Filed: Apr. 25, 2023

(65) Prior Publication Data

US 2024/0364730 A1 Oct. 31, 2024

(51) Int. Cl.
*H04L 9/40* (2022.01)

(52) U.S. Cl.
CPC ........ *H04L 63/1433* (2013.01); *H04L 63/083* (2013.01); *H04L 63/1425* (2013.01); *H04L 2463/082* (2013.01)

(58) Field of Classification Search
CPC ............... H04L 63/1433; H04L 63/083; H04L 63/1425; H04L 2463/082
See application file for complete search history.

(56) References Cited

U.S. PATENT DOCUMENTS 10,303,576 B1   5/2019   Seymour et al.
11,182,468 B1 * 11/2021   Walters ................... G06F 18/28
12,093,950 B2   9/2024   John
12,229,768 B2   2/2025   John
2015/0205708 A1   7/2015   Michelsen
2016/0140023 A1   5/2016   Michelsen et al.
2016/0217062 A1   7/2016   Singi et al.

(Continued)

OTHER PUBLICATIONS

Akers, A., What Is Step-Up Authentication When To Use It?, Okta, Auth0 Blog, Dec. 17, 2020, 14 pages (downloaded Apr. 6, 2023 from https://auth0.com/blog/what-is-step-up-authentication-when-to-use-it/.

(Continued)

*Primary Examiner* — Ayoub Alata

(57) ABSTRACT

A process, system and medium for detecting anomalous authentication requests to a protected resource during an authentication journey, in order to regulate step-up authentication are described. The process includes obtaining request features from the authentication request that triggered the authentication journey. The process includes processing, by an ensemble of Machine Learning (ML) models and a set of rule-based heuristics, a set of features based on the request features, the set of features associated with a userID. The process includes deriving risk sub-scores for each ML model and each heuristic. The process includes deriving a risk score based on the risk sub-scores. The process includes determining that the risk score exceeds an explanation-triggering threshold. The process includes providing, to a node in the authentication journey, the risk score with an explanation of the risk score. The system and medium are configured to execute the process, and configured to provide the explanation.

14 Claims, 27 Drawing Sheets

(56) References Cited

U.S. PATENT DOCUMENTS

| | | |
|---|---|---|
| 2017/0295062 A1 | 10/2017 | Tang |
| 2018/0189033 A1 | 7/2018 | Narang et al. |
| 2019/0087075 A1 | 3/2019 | Dhayanithi et al. |
| 2019/0392450 A1 | 12/2019 | Gosset et al. |
| 2020/0125483 A1 | 4/2020 | Lipke |
| 2021/0004253 A1 | 1/2021 | Barnes et al. |
| 2021/0072966 A1 | 3/2021 | Zong et al. |
| 2021/0194883 A1* | 6/2021 | Badhwar ............... H04L 63/107 |
| 2022/0108701 A1 | 4/2022 | Gupta et al. |
| 2022/0210151 A1* | 6/2022 | Williams ............ H04L 63/0861 |
| 2024/0107301 A1 | 3/2024 | Koral et al. |
| 2024/0195819 A1 | 6/2024 | Grajek |
| 2024/0362316 A1 | 10/2024 | Peddibhotla et al. |
| 2024/0428306 A1 | 12/2024 | Sliwka et al. |

OTHER PUBLICATIONS

Distinguish step-up from multi-factor authentication, IBM, Mar. 9, 2021, 2 pages, (downloaded Apr. 6, 2023 from https:// www.ibm.com/docs/en/sva/9.0.1?topic=authentication-distinguish-step-up-from-multi-factor).

Jordan, J., Variational autoencoders, JeremyJordan.me, Mar. 19, 2019, 15 pages (downloaded Mar. 21, 2023 from https://www.jeremyjordan.me/variational-autoencoders/).

About Autonomous Access—ForgeRock Identity Cloud Docs, ForgeRock, Inc. May 2022, 27 pages (downloaded Dec. 12, 2022 from https://backstage.forgerock.com/docs/idcloud/latest/auto-access/chap-about-autoaccess.html).

Huang, Z., Extensions to the k-Means Algorithm for Clustering Large Data Sets with Categorical Values, Data Mining and Knowledge Discovery, 2, 283-304 Sep. 1998 Kluwer Academic Publishers, 22 pages (https://doi.org/10.1023/A:1009769707641).

"Theme Node, Dynamically theme the ForgeRock out-of-the-box US on the fly", Oct. 2020, ForgeRock, Inc.,pp. 5 pgs. (downloaded from https://web.archive.org/web/20201024234908/https://backstage.forgerock.com/marketplace/entry/AXCzY977aAqky-XCyaXV).

"Theme Node, Dynamically theme the ForgeRock out-of-the-box US on the fly", Apr. 2020, ForgeRock, Inc.,, 8 pgs (downloaded from https://github.com/vscheuber/ThemeNode).

McKendrick, What is low-code and no-code? A guide to development platforms, ZDNet, Mar. 3, 2021,9 pgs (downloaded from https://www.zdnet.com/article/special-report-what-is-low-code-no-code-a-guide-to-development-platforms/).

Authentication and Single Sign-On Guide, ForgeRock Access Management 6.5, ForgeRock, Inc., Jul. 4, 2019, 482 pages.

Release Notes, AM 5.0.0, ForgeRock, Inc., Jun. 2, 2020.

Protect Users Witthout Frustrating Them Using AI-Driven Behavorial Biometrics, White Pater, Behavion Sec, 2020, (retrieved Dec. 14, 2021 from https://www.behaviosec.com/wp-content/uploads/2020/11/bhs-whitepaper.pdf).

Behavioral Biometrics for Mobile, BioCatch, 2021, 3 pages (retrieved Dec. 14, 2021 from https://www.biocatch.com/hubfs/New%20Boilerplate/BC%20SB%20Mobile%20Data%20v6%20NBP.pdf).

Innovating the Customer Experience Without Opening Fraud Floodgates, BioCatch, 10 pages (retrieved Dec. 14, 2021 from https://www.biocatch.com/hubfs/WP-Innovate-Customer-Experience-Without-Fraud.pdf).

Threat Matrix Guide, ID Dataweb, 7 pages (retrieved Dec. 14, 2021 from https://docs.iddataweb.com/docs/threatmetrix-1).

Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.

"Hardening your cluster's security", Kubernetes Engine, (https://cloud.google.com/kubernetes-engine/docs/concepts/security-overview), Jul. 2019, 10 pages.

Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.

"Configuring Vertical Pod Autoscaling", Kubernetes Engine, Google Cloud (https://cloud.google.com/kubernetes-engine/), Aug. 14, 2019, 8 pages.

Wilkin, "Kubernetes Deployment Dependencies", https://medium.com/google-cloud/kubernetes-deployment-dependencies-ef703e563956, Jul. 2, 2018, 21 pages.

"Vertical Pod Autoscaling", Kubernetes Engine, https://cloud.google.com/kubernetes-engine/docs/concepts/verticalpodautoscaler), Aug. 29, 2019, 8 pages.

Sakimura et al, "OpenID Connect Dynamic Client Registration 1.0 incorporating errata set 1", https://openid.net/specs/openid-connect-registration-1_0.html, Oct. 1, 2019, 19 pages.

Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.

"FAQ: IDM/OpenIDM performance and tuning", https://backstage.forgerock.com/knowledge/kb/article/a32504603, Jun. 26, 2019, 7 pages.

Amazon; AWS Elastic Beanstalk Developer Guide; Aug. 2019; 924 pgs (https://web.archive.org/web/20190805110626/https:// docs.aws.amazon.com/elasticbeanstalk/latest/dg/awseb-dg.pdf).

Kingma et al, Auto-Encoding Variational Bayes, arXiv:1312.6114v11 [stat.ML] Dec. 10, 2022].

U.S. Appl. No. 18/139,290, filed Apr. 25, 2023, Pending.

U.S. Appl. No. 18/139,295, filed Apr. 25, 2023, Pending.

U.S. Appl. No. 16/790,724, filed Feb. 13, 2020, U.S. Pat. No. 11,586,530, Feb. 21, 2023, Granted.

U.S. Appl. No. 18/111,501, filed Feb. 17, 2023, Pending.

U.S. Appl. No. 17/673,692, filed Feb. 16, 2022, US 2022/026383, Aug. 18, 2022, Pending.

Office Action for U.S. Appl. No. 18/139,295 mailed Feb. 14, 2025, 11 pages.

* cited by examiner

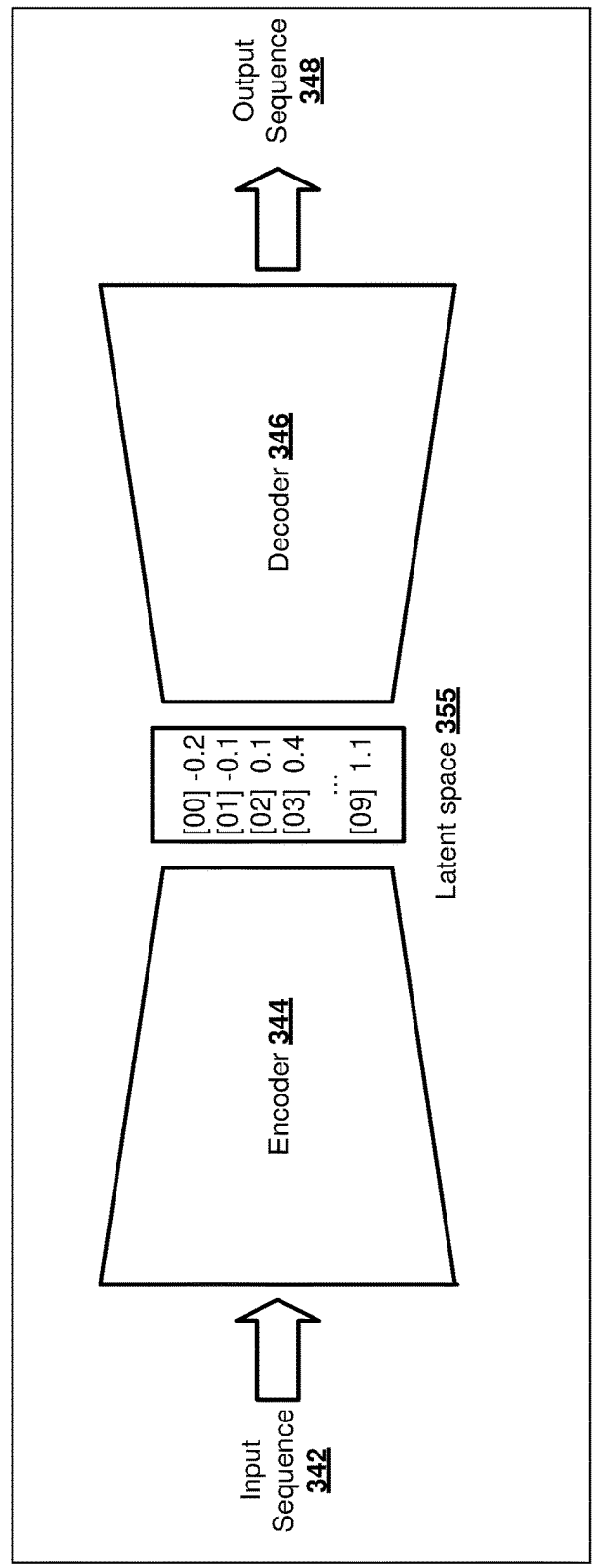
FIG. 3A - Autoencoder

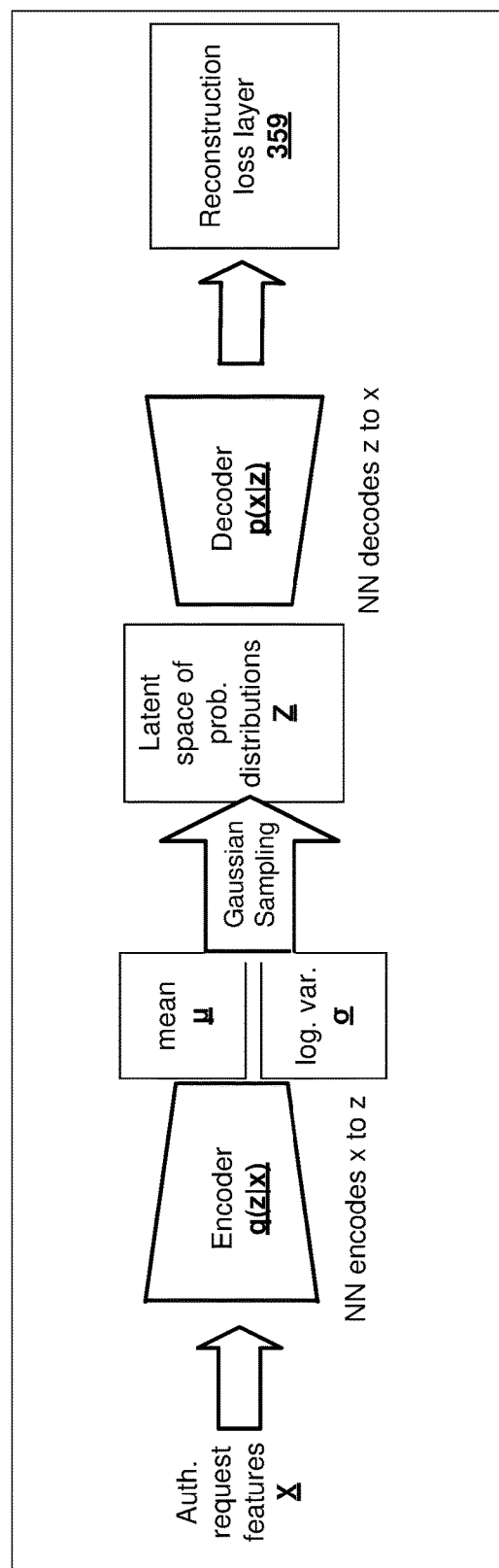
FIG. 3B – Variational Autoencoder

300c

| Event 310 | Country 311 | City 312 | Device 313 | OS 314 | ... | Dist. To Cluster 0 315 | Dist. To Cluster 1 316 | Dist. To Cluster 2 317 | Initial Assignment 318 |
|---|---|---|---|---|---|---|---|---|---|
| 0 | *USA* | *Alexandria* | *PC* | *Win-11* | | 0 | 1 | 2 | 0 |
| 1 | USA | Alexandria | PC | Win-11 | | 0 | 1 | 2 | 0 |
| 2 | USA | Miami | PC | Win-11 | | 1 | 0 | 2 | 1 |
| 3 | Russia | Moscow | Mac | Mac_OS | | 4 | 4 | 4 | Random[0..2] |
| 4 | *USA* | *Miami* | *PC* | *Win-11* | | 1 | 0 | 2 | 1 |
| 5 | USA | Alexandria | PC | Win-11 | | 0 | 1 | 2 | 0 |
| 6 | *Belarus* | *Minsk* | *PC* | *Win-11* | | 2 | 2 | 0 | 2 |
| 7 | Belarus | Barysaw | PC | Win-11 | | 2 | 2 | 1 | 2 |
| 8 | USA | Miami | PC | System V | | 2 | 1 | 2 | 1 |
| 9 | USA | New York | Mac | Mac_OS | | 3 | 3 | 4 | Random[0,1] |
| 10 | USA | New York | PC | Win-11 | | 1 | 1 | 2 | Random[0,1] |

Initial Cluster Assignment for Authentication Request Events

FIG. 3C K-mode training

300d

| Authentication Request Events for a Particular UserID ||||||||
|---|---|---|---|---|---|---|---|
| event 321 | country 322 | city 323 | device 324 | OS 325 | explain 1 326 | explain 2 327 | risk_score 328 |
| 1 | brazil | porto_alegre | mac | mac_os_x | city | country | 36.52837169 |
| 2 | brazil | porto_alegre | mac | mac_os_x | city | country | 36.52837169 |
| 3 | spain | madrid | other | windows | city | device | 91.70359703 |
| 4 | brazil | porto_alegre | mac | mac_os_x | city | country | 36.52837169 |
| 5 | brazil | porto_alegre | mac | mac_os_x | city | country | 29.48331436 |
| 6 | brazil | porto_alegre | mac | mac_os_x | city | country | 29.48331436 |
| 7 | brazil | porto_alegre | mac | mac_os_x | city | country | 36.52837169 |
| 8 | brazil | joinville | mac | mac_os_x | city | country | 33.71354406 |
| 9 | brazil | joinville | mac | mac_os_x | city | country | 33.71354406 |
| 10 | brazil | joinville | mac | mac_os_x | city | country | 36.52837169 |
| 11 | brazil | porto_alegre | mac | mac_os_x | city | country | 36.52837169 |
| 12 | brazil | porto_alegre | mac | mac_os_x | city | country | 36.52837169 |
| 13 | brazil | porto_alegre | mac | mac_os_x | city | country | 29.48331436 |

FIG. 3D – K-mode results

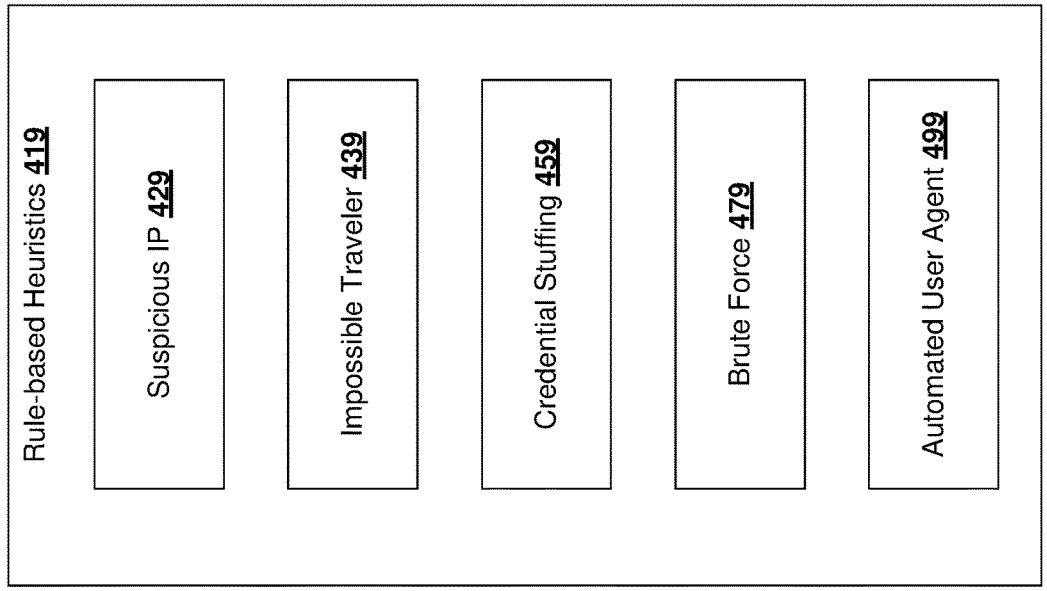
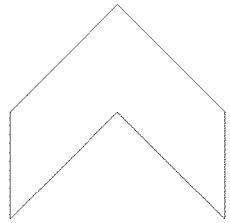
FIG. 4

500a

```
- name: Check if ready to respond
  withJoin:
    timeout: 10000
    nextStep: Respond
    isDone: 1-
      let listToComplete - [
        [.bruteForcePreventionCheck,  .stepStatus.brute_force_done ],
        [.credentialStuffing,   .stepStatus.credential_stuff_done ],
        [.impossibleTravellerCheck,   .stepStatus.impossible_travel_done ],
        [.suspiciousIPCheck,   ,stepStatus.suspicious_ip_done ],
        [.getfeatures,   ,stepStatus.get_features_done ],
        [.automatedUserAgentsFilter,   ,stepStatus.machine_to_machine_done ],
        [.clusteringModel,            ,stepStatus.cluster_done ],
        [.anomalyDetection,      ,stepStatus.debo_done ],
        [.anomalyDetection,       ,stepStatus.expainability_done ],
      ]
      all([for($listToComplete) .[1] if(.[0])
- name: Respond
  withStep:
    nextStep: null
    actions:
      - action: >-
          let heuristcRiskScores -
            [for(.risk_score_data.heuristic_agg_result.row_results) .risk_score]
```

510   let heuristcAgg - arrayMaxDouble($heuristcRiskScores, "heuristc_agg")

let reconstructionRiskScores - [for(.ueba_signal.reconstruction_model_results. models).risk_score]

520   let reconstructionModelRiskScores - arraySum($reconstructionRiskScore, "ueba") / (size) ($reconstructionmodelRiskScore) + 0.00001)

530   let modelResults - max($reconstructionModelRiskScore, .risk_score_data.clustering. result.risk_score)

540   let modelAgg - arrayMaxDouble($modelResults, "model_agg")

550   let risk_score - max($heuristicAgg, , $modelAgg")

```
     let risk_score_thresshold - 0.0
560  let is_risky_event - $risk_score > risk_score_thresshold
     {
       "risk_score_data": {
570      "is_risky_event":  $is_risky_event,
         "risk_score_threshhold":  $risk_score_threshhold,
         "risk_score":  $risk_score,
         "heuristic_risk_score":  $heuristicAgg,
         "reconstruction_model_risk_score":  $reconstructionModelRiskScore,
         "clustering_model_risk_score":  .risk_score_data.clustering_result.risk_score
         , * : .
       }
       , * - stepStatus : .
     }
```

{
"_index" : "risk_explainability-0000001",
"_type" : "_doc",
"_id" : "ESd0H4QBhQcc0wnQ16vW",
"_score" : 1.0,
831a "_source" : {
"eventTime" : "2022-03-11T03:32:16.336104Z",
"clientIP" : "27.7.30.164",
"referer" : [
"http://sso.forgerock.com:80/json/realms/root/realms/community/authenticate"
],
"username" : "jamie.holcolmbe6",
"user-agent" : [
"Mozilla/5.0 (X11; Linux x86_64; rv:78.0) Gecko/20100101 Firefox/78.0"
],
815a "heuristic_agg_result" : {
"raw_results" : [
{
"risk_score" : 0,
"is_automated_user_agent" : false,
"user_agent" : "Mozilla/5.0 (X11; Linux x86_64; rv:78.0) Gecko/20100101 Firefox/78.0",
"matching_user_agent_patterns" : "[]",
"input_timestamp" : "2022-03-11T03:32:16.336104Z",
"user_agent_parser_version_info" :
"ua_count,336,os_count,179,device_count,620",
"error_message" : ""
},
{
"user_id" : "user_id not found",
"is_impossible_travel" : false,
"risk_score" : 0,
"system_timestamp" : "2022-07-21T21:04:54.175777",
"error_message" : "Results from elasticsearch empty for first geopoint. Could not parse impossible travel"
},
{
"risk_score" : 0,
"is_brute_force" : false,
"user_id" : "jamie^holcolmbe6",
"input_timestamp" : "2022-03-11T03:32:16.336104Z",
"lookback_time_ms" : 300000,
"found_events_in_window_for_user_id" : 0,
"error_message" : ""
},
{
"risk_score" : 0,
"is_suspicious_ip" : false,
"ip_address" : "27.7.30.164",
"input_timestamp" : "2022-03-11T03:32:16.336104Z",
"lookback_time_ms" : 300000,
851a "bruteForcePreventionCheck" : true,
"suspiciousIPCheck" : true,
"credentialStuffing" : true,
"impossibleTravellerCheck" : true,
"automatedUserAgentsFilter" : true,
"anomalyDetection" : true,
"finalOutcome" : "FAILURE",
871a "predictionResult" : {
"risk_score_data" : {
"is_risky_event" : true,
"risk_score_threshhold" : 49,
"risk_score" : 49.99975000124999,
"heuristic_risk_score" : 0,
"reconstruction_model_risk_score" : 49.99975000124999,
"clustering_model_risk_score" : 15.755470475720893,
"ueba_avg_risk_score" : 49.99975000124999,

```
"found_events_in_window_for_ip_address" : 0,
    "error_message" : ""
},
{
    "risk_score" : 0,
    "is_credential_stuffing" : false,
    "ip_address" : "27.7.30.164",
    "input_timestamp" : "2022-03-11T03:32:16.336104Z",
    "lookback_time_ms" : 600000,
    "found_user_ids_for_ip_address" : 0,
    "error_message" : ""
}
],
```

815b
```
"cluster_explainability" : {
    "dayparting" : 9.499812032302682,
    "browser" : 28.173091648031406,
    "os" : 18.999624064605364,
    "weekday" : 15.493526096881858,
    "osWithVersion" : 27.833946158241977
},
"top_cluster_explainability" : [
    "browser",
    "osWithVersion"
],
"is_ueba_child" : true
}
```

851b
```
"clustering_result" : {
    "risk_score" : 15.755470475720893,
    "count_for_user" : 71,
    "predicted_cluster" : {
        "cluster_name" : 4,
        "cluster_distance" : 11.564568698122066,
        "cluster_centroid_values" :
"""{"osWithVersion":"windows_windows_10","dayparting":"morni
ng","weekday":"thursday","browser":"chrome","os":"windows","dev
ice":"other","city":"bengaluru_india_india","country":"india"}"""
    },
    "closest_relevant_cluster_for_user_bin" : {
        "cluster_name" : 4,
        "cluster_distance" : 11.564568698122066,
        "cluster_centroid_values" :
"""{"osWithVersion":"windows_windows_10","dayparting":"morni
ng","weekday":"thursday","browser":"chrome","os":"windows","dev
ice":"other","city":"bengaluru_india_india","country":"india"}"""
    },
```

855b
```
"ueba_signal" : {
    "reconstruction_model_results" : {
        "user_id" : "jamie^holcolmbe6",
        "models" : [
```

865b
```
{
    "reconstruction_loss" : 0.3195178508758545,
    "model_name" : "autoencoder",
    "risk_score" : 0,
    "score_message" : "",
    "event_count_for_user" : 110,
    "std_dev_for_user" : 0.0336611152,
    "avg_rec_loss_for_user" : 0.2399756213,
    "model_version" : "1",
    "model_location" : "gs://fr-
8ooea569ssdxvxe0e9f9xqbd3oe-auto-access-output/1c4a21b6-5d78-
4525-a41d-78000a8dac56/autoencoder_model/
dev_autoencoder_export_dir_1/",
    "is_ueba_child" : true
},
```

811c
```
{
    "reconstruction_loss" : 0.3509464561939239,
    "kl_loss" : 1.9380655,
    "model_name" : "vae",
    "risk_score" : 100,
    "score_message" : "",
    "event_count_for_user" : 110,
    "std_dev_for_user" : 0.1831793737,
    "avg_rec_loss_for_user" : 0.0494073139,
    "model_version" : "1",
    "model_location" : "gs://fr-8ooea569ssdxvxe0e9f9xqbd3oe-auto-access-output/1c4a21b6-5d78-4525-a41d-78000a8dac56/vae_model/vae_export_dir_1/",
    "is_ueba_child" : true
},
...
],
"features_used" : [
    "jamie^holcolmbe6",
    "bengaluru_india",
    "india",
    "friday",
    "night",
    "other",
    "none",
    "linux",
    "linux_unexpected_os",
    "firefox",
    "authentication"
],
```

891c
```
"explainable_features" : "country",
"explainability" : {
    "response" : "country",
```

"features" : {
    "eventId" : "20a02519-8e93-487f-8151-7dfb00bd0097",
    "userId" : "jamie^holcolmbe6",
    "time" : "2022-03-11T03:32:16.336104Z",
    "ipAddress" : "27.7.30.164",
    "timestamp" : "2022-03-11T03:32:16.336104",
    "geoData" : {
        "city" : "bengaluru_india",
        "country" : "india",
        "lat" : 12.9634,
        "longitude" : 77.5855,
        "timeZone" : "Asia/Kolkata",
        "lat-lon" : "12.9634, 77.5855"
    },
    "browserData" : {
        "os" : "linux",
        "osVersion" : "linux_unexpected_os",
        "userAgentType" : "firefox",
        "device" : "other",
        "deviceType" : "none",
        "uaFamily" : "firefox",
        "uaStringRaw" : "Mozilla/5.0 (X11; Linux x86_64; rv:78.0) Gecko/20100101 Firefox/78.0",
        "userAgent" : "Mozilla/5.0 (X11; Linux x86_64; rv:78.0) Gecko/20100101 Firefox/78.0",
        "dayparting" : "night",
        "weekday" : "friday",
        "rawUserId" : "jamie.holcolmbe6",
        "isAuth" : true,

FIG. 8C

```
"heuristicMetaData" : { }
},
"raw_event_data" : {
  "eventTime" : "2022-03-11T03:32:16.336104Z",
  "clientIP" : "27.7.30.164",
  "referer" : [
    "http://sso.forgerock.com:80/json/realms/root/realms/community/authenticate"
  ],
  "username" : "jamie.holcolmbe6",
  "user-agent" : [
    "Mozilla/5.0 (X11; Linux x86_64; rv:78.0) Gecko/20100101 Firefox/78.0"
  ],
  "bruteForcePreventionCheck" : true,
  "suspiciousIPCheck" : true,
  "credentialStuffing" : true,
  "impossibleTravellerCheck" : true,
  "automatedUserAgentsFilter" : true,
  "anomalyDetection" : true
},
"eventTime" : "2022-03-11T03:32:16.336104Z",
"clientIP" : "27.7.30.164",
"referer" : [
  "http://sso.forgerock.com:80/json/realms/root/realms/community/authenticate"
],
"username" : "jamie.holcolmbe6",
"user-agent" : [
  "Mozilla/5.0 (X11; Linux x86_64; rv:78.0) Gecko/20100101 Firefox/78.0"
],
"bruteForcePreventionCheck" : true,
"suspiciousIPCheck" : true,
"credentialStuffing" : true,
"impossibleTravellerCheck" : true,
"automatedUserAgentsFilter" : true,
"anomalyDetection" : true
}
},
```

ACCESS PREDICTION SERVICE SERVING EXPLAINABLE RISK SCORES

RELATED APPLICATIONS

This application is related to the following contemporaneously filed applications:

U.S. patent application Ser. No. 18/139,290, titled "Step-Up Authentication Conditioned On Risk Score Explainability," filed 25 Apr. 2023; and U.S. patent application Ser. No. 18/139,295, titled "Access Prediction Service Receiving Authentication Journey Characteristics for Supervised Learning," filed 25 Apr. 2023. This application is also related to the following commonly owned applications:

U.S. patent application Ser. No. 16/790,724, titled "Methods and Systems for Correctly Assembling Component Sequences," filed 13 Feb. 2020, now U.S. Pat. No. 11,586,530, issued 21 Feb. 2023; and U.S. patent application Ser. No. 17/673,692, titled, "Authentication And Access Management For Heterogeneous Sources Of Anomaly Detection Data," filed on 16 Feb. 2022 which claims the benefit of U.S. Provisional Application No. 63/150,042, filed 16 Feb. 2021; and U.S. Patent Application No. 63/443,337, titled, "Intercepting Worthless Requests at the Network Edge Using Machine Learning," filed on 3 Feb. 2023.

These forgoing related applications are hereby incorporated by reference for all purposes.

TECHNICAL FIELD

The technical field relates to computer security, specifically to step-up authentication with conditional invocation of step-up authentication based on anomalous requests during an authentication journey without burdening legitimate users. The technology specifically detects anomalous authentication requests to a protected resource to conditionally invoke step-up authentication.

INCORPORATIONS

The following materials are incorporated by reference for all purposes as if fully set forth herein:

"Extensions to the k-Means Algorithm for Clustering Large Data Sets with Categorical Values" by Zhexue Huang, published in Data Mining and Knowledge Discovery 2, 283-304 (1998).

"Auto-Encoding Variational Bayes" by Diederik Kingma et al., published arXiv: 1312.6114v10 [statML] (2014).

BACKGROUND

When an authentication attempt from a client to a protected network endpoint is anomalous, such an attempt could be understood as more risky and might require step-up authentication. For example, if a sophisticated authentication system knows that a user usually attempts to log into his or her account from Miami, Florida, but the user suddenly tries to log in from Alexandria, Virginia, that login attempt could be an anomaly. Even if the initial authentication credentials provided (e.g., userID and password) is correct, the unusual context surrounding the authentication request suggests that stepping up the security requirement with step-up authentication is prudent.

Although several mechanisms of step-up are available, they usually share a common trait: they are annoying. The fact that a legitimate user is being asked for extra authentication after providing a legitimate userID and password can make the user feel as if he or she is being harassed. Step-up authentication can feel like a waste of time to the user when the reason for the anomaly is known and approved by the organization, e.g., the user is anomalously logging in from a different city than usual because the user is approved to telework one day a week.

The extra time spent on step-up authentication can cause unnecessary frustration. Step-up authentication takes time to complete, and sometimes users do not have that time to spend. A user who is trying to login to make changes to a document an hour before its deadline can experience a sense of frustration and impatience at the extra time spent on what feels like an unnecessary step.

Step-up authentication can still be desirable to catch malicious actors and bots from gaining access to protected endpoints. Stolen or guessed credentials are still a cause of security breaches. Network administrators can be unwilling to entirely forgo step-up authentication when the alternative is for the network to suffer security breaches.

An opportunity arises to utilize conditional invocation of step-up authentication based on anomalous requests during an authentication journey; to detect anomalous authentication requests to a customer endpoint during an authentication journey, in order to conditionally invoke step-up authentication; and to train Machine Learning (ML) models based on the features of an authentication journey. Improved network protection can result.

BRIEF DESCRIPTION OF THE DRAWINGS

FIG. 3A illustrates an autoencoder.

FIG. 3B illustrates a variational autoencoder.

FIG. 3C illustrates a table of Initial Cluster Assignment for Authentication Request Events usable to demonstrate k-mode clustering.

FIG. 3D illustrates a table of user access characteristics, used to demonstrate how k-modes can detect anomaly FIG. 4. illustrates several example rule-based heuristics that can signal anomaly.

FIG. 5A. illustrates example code for an ensemble approach to obtaining a risk score that combines autoencoding models, clustering models and rule-based heuristics.

FIG. 5B continues to illustrate example code for the ensemble approach to obtaining the risk score that combines autoencoding models, clustering models and rule-based heuristics.

FIG. 8A illustrates the first of four segments of a JSON code example for explainability for the disclosed technology.

FIG. 8B shows the second of four segments of a JSON code example for explainability for the disclosed technology.

FIG. 8C lists the third of four segments of a JSON code example for explainability for the disclosed technology.

FIG. 8D shows the fourth segment of a JSON code example for explainability for the disclosed technology.

DETAILED DESCRIPTION

Figure 1:
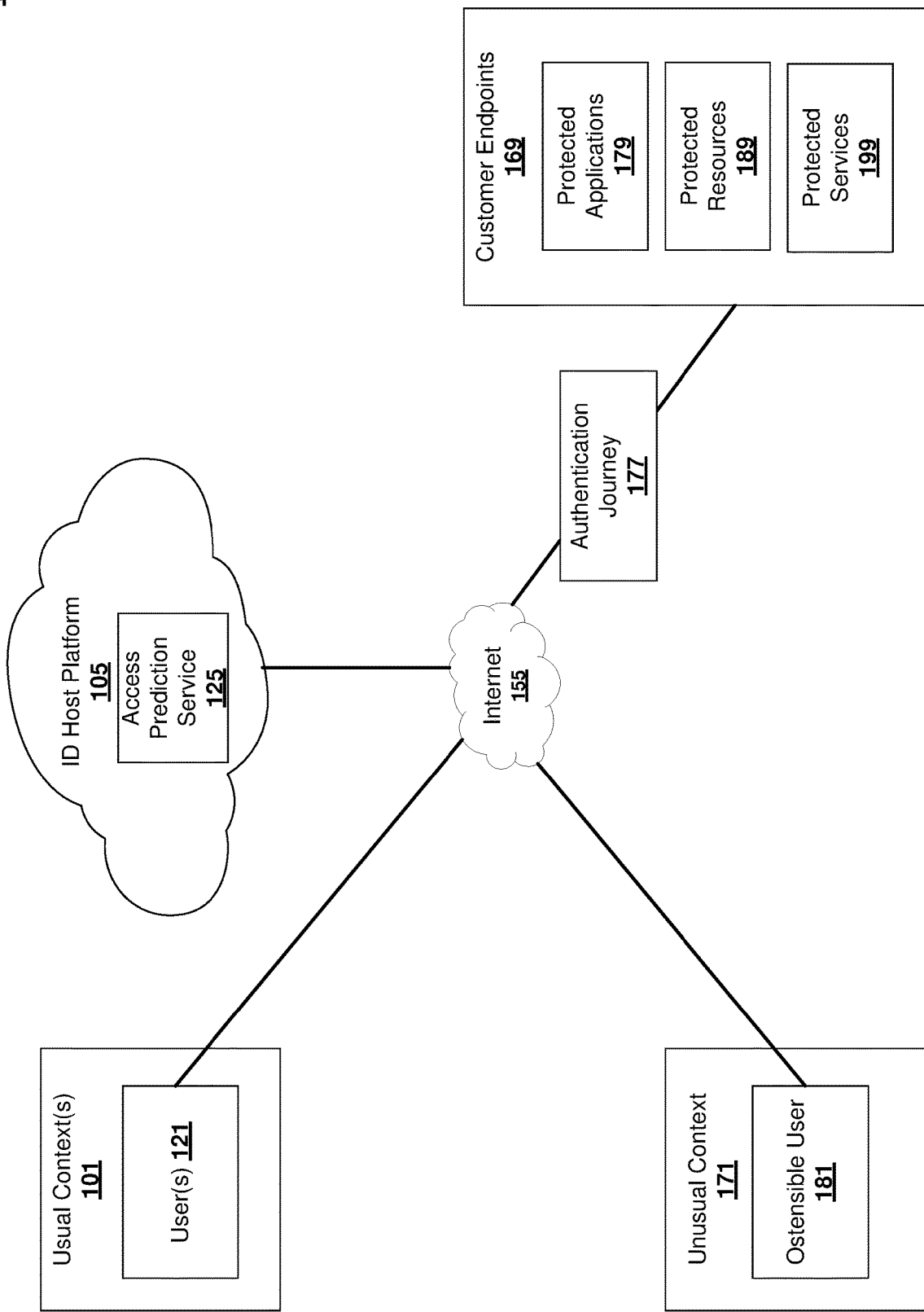
FIG. 1 illustrates an example architecture for conditional invocation of step-up authentication based on anomalous requests during an authentication journey without burdening legitimate users, for detecting anomalous authentication requests to a customer endpoint during an authentication journey, and for training ML models based on the features of an authentication journey, according to one implementation of the disclosed technology.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed next:

| | |
|---|---|
| 2FA | Two-Factor Authentication |
| AE | AutoEncoder |
| ETL | Extract-Transform-Load |
| ID | Identity |
| IDP | Identity Provider |
| MFA | Multi-Factor Authentication |
| ML | Machine Learning |
| OS | Operating System |
| OTP | One Time Password |
| PR | Precision Recall |
| ROC | Receiver Operating Characteristic |
| SSO | Single Sign-On |
| VAE | Variational Auto Encoder |

Turning to the nomenclature, as used herein, "step-up authentication" refers to an additional security challenge to an ostensible user to establish their identity beyond initial credentials received in response to a request for a userID and password or from a SSO source. Examples of step-up include multi-factor authentication, CAPTCHA, biometrics, and similar techniques. "Multi-Factor Authentication" (MFA), as used herein, refers to a challenge that obtains additional factors that will be used to determine whether the ostensible user is authentically the user, or whether the ostensible user is someone else who masquerades as the user. Examples of such factors include user knowledge (e.g., security questions or one-time passwords (OTP), user possession (e.g., RSA SecurID key fob including those that were designed for two-factor authentication (2FA), or a security code, sent through a data channel such as SMS, to a user's smartphone) and biometrics (e.g., fingerprints, facial recognition, retina scan). In some examples, more than one factor may be required as part of MFA.

One challenge that network administrators face is the how to balance the classic tradeoff of maintaining a high level of network security while preserving network usability to users that have passed basic authentication methods (e.g., provided a proper userID and password that has passed the username/password check).

The disclosed technology provides conditional invocation of step-up authentication based on anomalous requests during an authentication journey, without burdening legitimate users. The technology detects authentication request anomalies and provides a risk score and an explanation of the risk score. The technology also discloses comparing an explanation of the risk score to past explanations of past risk scores for the same userID, with one or more past step-up challenge that the user successfully passed. The technology discloses conditionally issuing a new step-up challenge based on the comparison. An enhancement of the technology also includes capturing the features of successful authentication journeys to train supervised ML models.

ML models and heuristics can be included in an ensemble of risk score generators. Implementing AI systems to supplement rule-based heuristics leads to generation of risk scores instead of binary pass/fail outcomes for each of the heuristics. An ensemble combines risk sources from multiple detectors. Some of these detectors can be interrogated to produce explainable results.

Use of an ensemble of ML models to return a risk score can improve accuracy of positive alerts. Explainable results from ML are harnessed to reduce false positive alerts. Heuristics are used to harness evidence known to signal risk.

Next, we describe an architecture for conditional invocation of step-up authentication based on anomalous requests during an authentication journey without burdening legitimate users, for detecting anomalous authentication requests to a customer endpoint during an authentication journey and for training ML models based on the features of an authentication journey.

Architecture

FIG. 1 illustrates an example architecture for conditional invocation of step-up authentication based on anomalous requests during an authentication journey without burdening legitimate users, for detecting anomalous authentication requests to a customer endpoint during an authentication journey and for training ML models based on the features of an authentication journey. System 100 includes usual context 101, users 121, identity host platform 105, access prediction service 125, Internet 155, anomalous context 171, ostensible user 181, authentication journey 177, customer endpoints 169, including protected applications 179, protected resources 189 and protected services 199.

A context is a set of access attempt features that can be used to characterize an authentication request. Context can be determined from data headers or other surrounding information related to the authentication request. Data header can include information such as IP address, ports, host, user-agent, and other information that can be obtained from headers at any network level. Surrounding information can include the time the authentication request was received, the userID and password being sent with the authentication request, and other metadata or data related to the request.

Usual context 101 represents one or more contexts from which users 121 usually access customer endpoints 169. Unusual context 171 represents a context for an access attempt from ostensible user 181. Ostensible user 181 is so-called because the authentication request ostensibly from an authentic user, but in reality, could either be from the authentic user or from a malicious entity that has hijacked the credentials from one or more authentic users. Ostensible user 181 is a candidate for step-up.

IDentity (ID) host platform 105 is a platform that hosts access prediction service 125. In some implementations, ID host platform 105 can be an ID management platform managed by a party other than the network owner, such as ForgeRock™ Identity Cloud. In such implementations, access prediction service 125 can be part of a cloud based product such as ForgeRock™ Autonomous Access. In other implementations, ID Host Platform 105 can be a customer-managed system (such as an identity management platform hosted on the customer network system, or hosted a cloud-based system but managed by the customer). In such implementations, access prediction service can be a service driven by a self-created machine learning model or one built-into the identity management platform. In still other implementations, ID Host Platform 105 can be from an identity management software purveyor such as Okta, PingIdentity, or Microsoft.

Authentication journey 177 can be configured to determine whether the request is from a legitimate user or not. Authentication journey 177 can include complex conditions and interactions beyond a userID and password check, such as Single Sign-On (SSO) based on an Identity Provider (IDP), registration of new accounts, timeouts based on multiple attempts to access the same account, and other authentication features. Authentication journey 177 can acquire the context of an authentication request to determine, for the user, whether the context is a usual context 101 or an unusual context 171.

An authentication journey that uses a proper userID and password or SSO credential presented from a usual context 101 is expected to authenticate the user as authentic, and the authentication journey can continue without step-up authentication. A proper userID and password or SSO credential presented from an unusual context 171 is one event that can flag the possibility that the ostensible user 181 who professes to be one of users 121 is actually a different user. That said, even an authentic user can have a different authentication context for legitimate reasons (e.g., business travel, or working odd hours to meet an urgent deadline). Step-up authentication can be used to gain confidence that ostensible user 181 is indeed one of authentic users 121.

Previous authentication requests from ostensible user 181 from unusual context 171 can provide information that the current authentication request by ostensible user 181 from unusual context 171 is authentic without the need to burden the user with step-up.

Customer endpoints 169 include communication endpoints to which users 121 have access. In this example, customer endpoints 169 include protected applications 179, protected resources 189 and protected services 199.

Internet 155 is a worldwide communication network that is readily understood by many and is therefore not described in detail here.

Enhancing Step-Up Authentication with an Explainability-Based Conditional

Figure 2A:
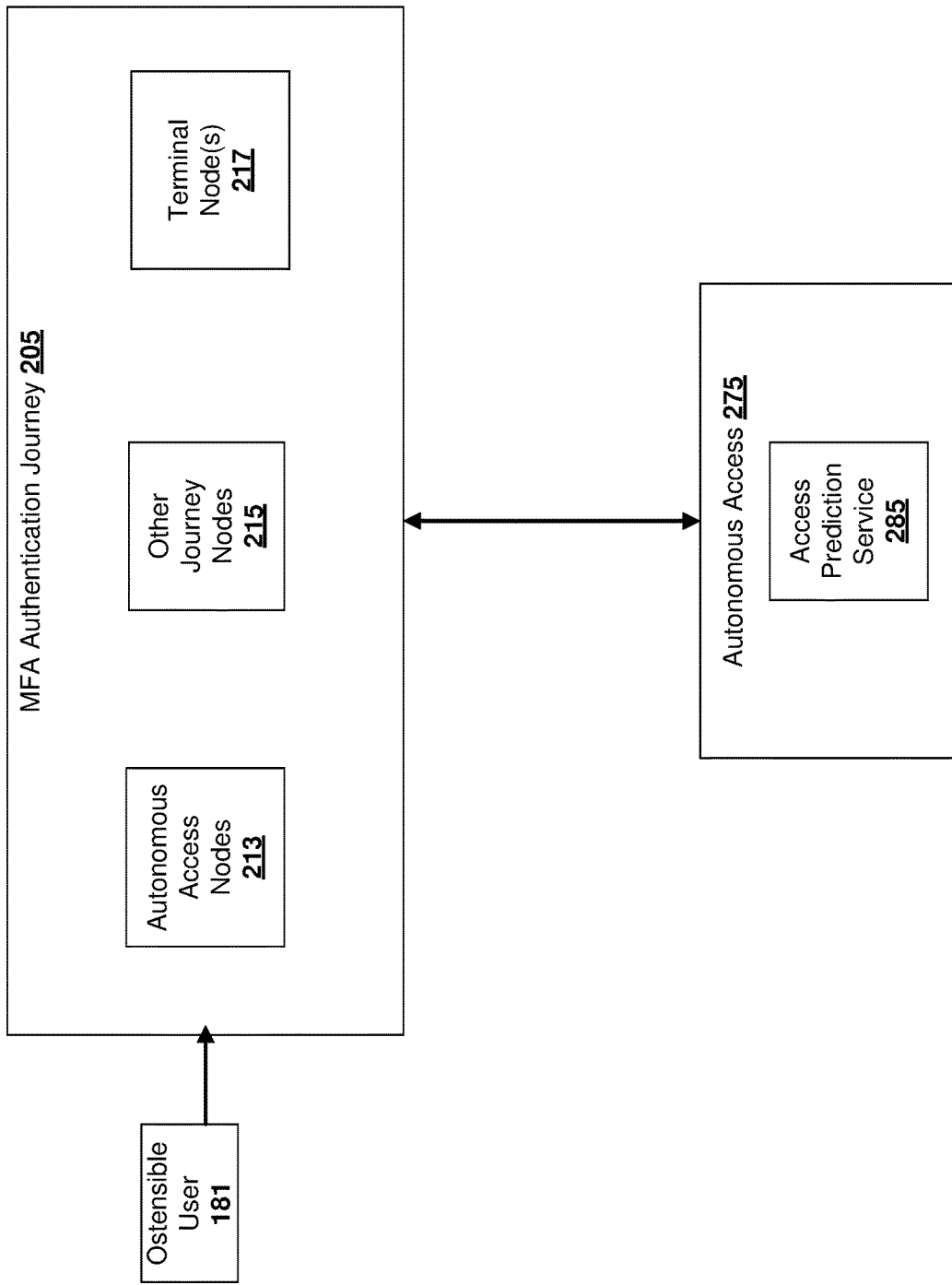
FIG. 2A illustrates a high level block diagram of the disclosed technology using the example of ForgeRock™ Autonomous Access.
Figure 2B:
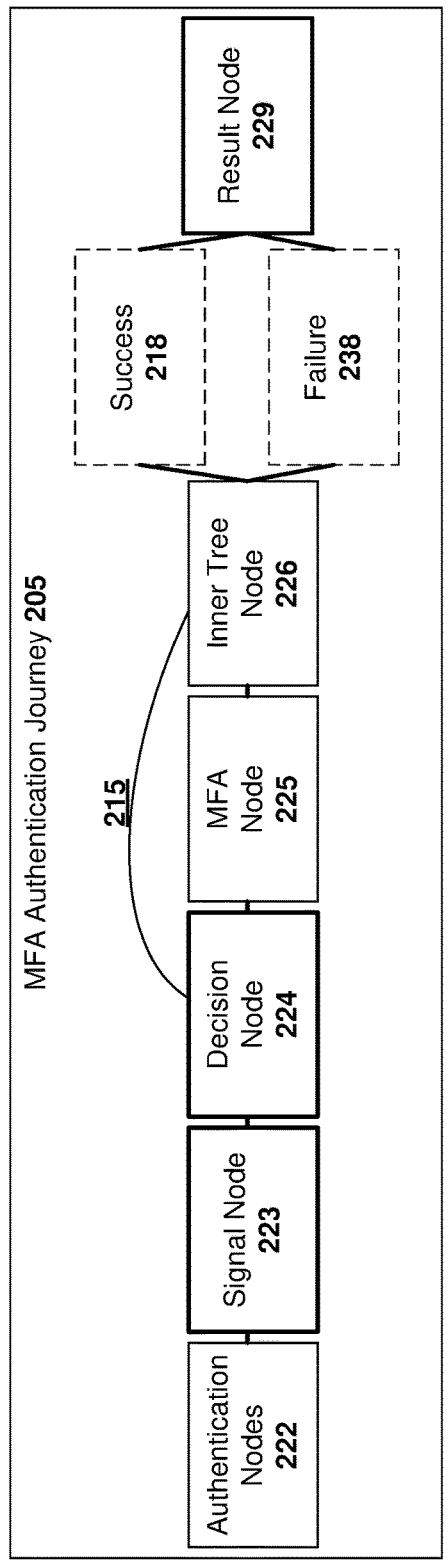
FIG. 2B illustrates a high level block diagram of an example multi-factor authentication journey.
Figure 2C:
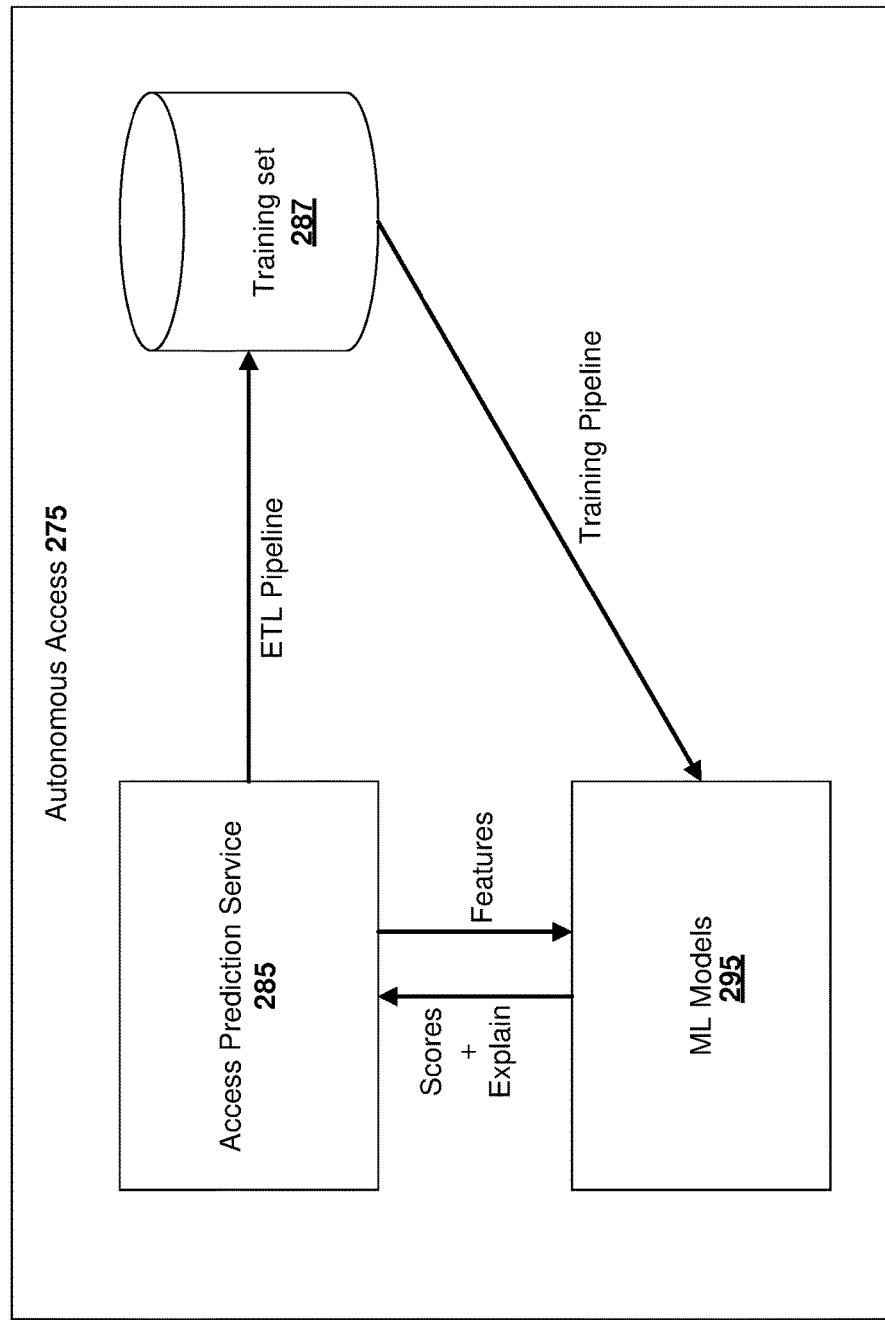
FIG. 2C illustrates shows a functional block diagrams for the disclosed Autonomous Access system.

FIG. 2A illustrates a diagram of the technology using the example of ForgeRock™ Autonomous Access. Diagram 200 includes ostensible user 181, Multi-Factor Authentication (MFA) Authentication Journey 205, Autonomous Access nodes 213, other journey nodes 215, terminal node(s) 217, Autonomous Access 275 and access prediction service 285. The authentication request from ostensible user 181 is received by MFA authentication journey 205. MFA Authentication journey 205 includes interface elements of Autonomous Access nodes 213, other journey nodes 215 and terminal node(s) 217. MFA Authentication journey 205 represents an authentication journey that can require step-up authentication using MFA. FIG. 2B shows the high level block diagram of an example multi-factor authentication journey 205, as described below. FIG. 2C shows a functional block diagram for disclosed Autonomous Access 275, also described below.

MFA authentication journey 205 routes an authentication request from ostensible user 181 through journey nodes, and the routing path depends on the level of risk that an authentication request poses. An authentication request provided by ostensible user 181 under anomalous circumstances can prompt an additional challenge for evidence that ostensible user 181 is an authentic user. Autonomous Access nodes 213 are journey nodes that facilitate evaluating the risk of a user being inauthentic by communicating request features to access prediction service 285 and receiving feedback that reflects the level of risk. The feedback from the access prediction service can include a risk score that reflects whether the request is anomalous for that particular userID. Additionally, the risk score can be accompanied by an explanation of the risk score that explains the anomaly. In some implementations of the disclosed technology, the explanation accompanies the risk score if some condition is satisfied. Example conditions include a threshold level of risk score being exceeded, a configuration option to return an explanation irrespective of a threshold is toggled, a concurrence of high risk amongst a threshold number of models, etc.

MFA Authentication journey 205 can use the feedback to route the request to an appropriate branch of the authentication journey, and in particular, can use any part of the feedback to determine whether to invoke step-up authentication (here, MFA). A risk score can indicate high risk, for example, by exceeding a risk threshold, or by falling within a range indicating a high risk level.

MFA authentication journey 205 can also use the explanation in the feedback, when available, for routing the request to the appropriate branch of the authentication journey to determine whether to invoke step-up authentication (here, MFA). MFA authentication journey 205 can be configured to avoid challenging a user with MFA in spite of risk score indicating high risk, such as when the score exceeds a threshold or falls within a preset range, based on comparisons of the explanation with historical authentication requests from the userID. For example, when a request made by userID X.Ample has feedback with a risk score and explanation, MFA journey 205 can also use the explanation when determining whether to invoke MFA.

Continuing the example, the feedback from the access prediction service can also contain an explanation that the request is anomalous because the request was sent from a different geographic location city than the usual geographic city. In one example, X. Ample typically attempts to access the communication endpoint from Miami, FL. Here and now, X.Ample attempted to access the communication endpoint from Alexandria, VA. MFA authentication journey 205, configured to access and review the recent access attempts by userID X.Ample, reviews the history of X. Ample's authentication attempts, which shows that X. Ample was recently and previously challenged to MFA, and passed the challenge. The previous high risk score was accompanied by the explanation that X. Ample had attempted to login from an anomalous city. A comparison between the risk-score explanation with a previous risk-score explanation of a previous risk score finds that the explanations match. Based on the match, MFA authentication journey 205 can decide to avoid challenging X.Ample with MFA, despite the high risk score. The recently passed challenge suggests that the user X. Ample might be traveling this week and the login attempt is likely from the authentic X. Ample. On the other hand, if the request, ostensibly from X.Ample, exhibits other types of anomalous behavior (e.g., userID X.Ample is associated with an account operated by a human, but the access attempt behaves like a bot), then an explanation does not match the explanation from a previous authentication request requiring step-up. The current authentication request can be challenged with step-up authentication.

The disclosed technology encompasses both the explanation matching as determinative for whether to invoke step-up, and the explanation matching as a considered but-not-determinative factor for whether to invoke step-up. MFA authentication journey 205 can consider additional factors, in some implementations.

Continuing the description of diagram 200a of FIG. 2A, after the user traverses the authentication journey, the user's journey reaches terminal node(s) 217. Terminal node(s) 217 indicate whether the authentication journey succeeded or failed. If terminal node(s) 217 indicate success, the result can be passed on to the intended communication endpoint. If terminal node(s) 217 indicate failure, the user can be informed of the failure, or if the user is potentially malicious, MFA authentication journey 205 can cause other responses to be invoked. As a further enhancement, terminal node(s) 217 can be used as a label for ML model training. In addition to the responses to terminal node(s) 217, MFA authentication journey 205 can provide the request and various metadata related to the journey to access prediction service 285 for use in tuning the predictions and/or incorporate into a training set. Next, we describe the features of the MFA authentication journey 205 and how MFA authentication journey 205 handles the request in more detail.

FIG. 2B illustrates high level features 200b of an example authentication journey, with MFA. The example illustrates MFA authentication journey 205 as a journey tree with authentication nodes 222, signal node 223, decision node 224, MFA node 225, Inner Tree node 226, success node 218, failure node 238, result node 229. The disclosed autonomous access nodes 213 are signal node 223, decision node 224 and result node 229. Other journey nodes are authentication nodes 222, MFA node 225 and Inner Tree node 226. Terminal nodes are success node 218 and failure node 238.

Authentication nodes 222 receive an authentication request from a client, ostensibly from a user. The authentication request can undergo processing in authentication nodes 222, such as obtaining a userID and password from the user through respective nodes, and determining that the userID and password match a user entry in an access control list. Once the userID and password are matched, authentication nodes 222 can indicate success and provides the request for other authentication processing, including a determination of whether or not to perform step-up authentication.

Signal node 223 is a node configured to send the userID and features, such as features of the authentication request, to an access prediction service. Signal node 223 can parse the authentication request and extract features to be sent. Signal node 223 can also derive features to be sent based on the parsed authentication request. In some circumstances, the authentication request header can also be sent, and further feature extraction can occur at the direction of access prediction service 285. Examples of extracted features include request information such as source IP address, a user-agent string, and other such information that can be found in a request header or payload. Related information, such as a timestamp of when the request was received, can also be included in extracted features. Examples of derived features include a user agent string after processing the extracted string to remove obscure characters, separating the user-agent string into device (e.g., PC, Mac, Android), model, operating system (OS) (e.g., Windows, OS X) and OS version (e.g., Windows 11). As additional examples of derived features, source IP can be matched against an IP geolocation database to obtain features of city (e.g., Alexandria) and country (e.g., Egypt) that originated the authentication request. The timestamp of when the authentication request was received can be mapped to obtain features of day of the week (Sunday through Saturday, alternatively: weekday, weekend) and part of day (aka "dayparting" e.g., "morning," "afternoon," "evening," and "night").

Signal node 223 is also configured to receive feedback from the access prediction service. The feedback includes at least a risk score. The feedback can also include an explanation of the risk score. Signal node 223 passes the received feedback to decision node 224. Decision node 224 relies on received feedback to decide how to route a request along MFA authentication journey 205. Routing options include:
 If the risk score is low (e.g., does not exceed a risk score threshold), then decision node 224 selects to not route the request to MFA node 225.
 If the risk score is high (e.g., exceeds a risk score threshold) then decision node 224 tries to match the accompanying explanation with any explanation for a step-up challenge that the user successfully passed previously. If there is a match, then decision node 224 selects to not route the request to MFA node 225.
 Otherwise, the decision node 224 selects to route the request to MFA node 225.

Other configurations of decision node 224 can supplement or supplant the behavior of decision node 224 described above, based on the customer's particular access policies or requirements. MFA node 225 presents an MFA challenge to the user, if the request is routed to MFA node 225. The MFA challenge requires that the client provide verification factors beyond the userID and password that the client previously presented. Additional verification factors can include, but are not limited to, reproducing a One Time Password (OTP) sent to a phone number or email account that is controlled by the ostensible user, providing answers to security questions that match previously provided security questions, the use of hardware-based authentication such as security badges/cards/fobs/keys or biometric authentication, software-based credentials (such as a digitally signed certificate), and other such factors. The user's behavior in response to the MFA challenge, and at least whether the journey reached success node 218 or failure node 238 is recorded and provided to inner tree node 226. The outcome determines how the request itself is further handled, and post-journey handling of the request itself is not a focus of this disclosure. The outcome is either success node 218 or failure node 238 once the request has been routed through inner tree node 226.

MFA node 225 presents an MFA challenge to the user, if the request is routed to MFA node 225. The MFA challenge requires that the client provide verification factors beyond the userID and password that the client previously presented. Additional verification factors may include, but are not limited to, reproducing a One Time Password (OTP) sent to a phone number or email account that is controlled by the ostensible user, providing answers to security questions that match previously provided security questions, the use of hardware-based authentication such as security badges/cards/fobs/keys or biometric authentication, software-based credentials (such as a digitally signed certificate), and other such factors. The user's behavior in response to the MFA challenge and whether the MFA challenge was passed are recorded and provided to inner tree node 226. The outcome determines how the request itself is further handled and post-journey handling of the request itself is not a focus of this disclosure.

Figure 7:
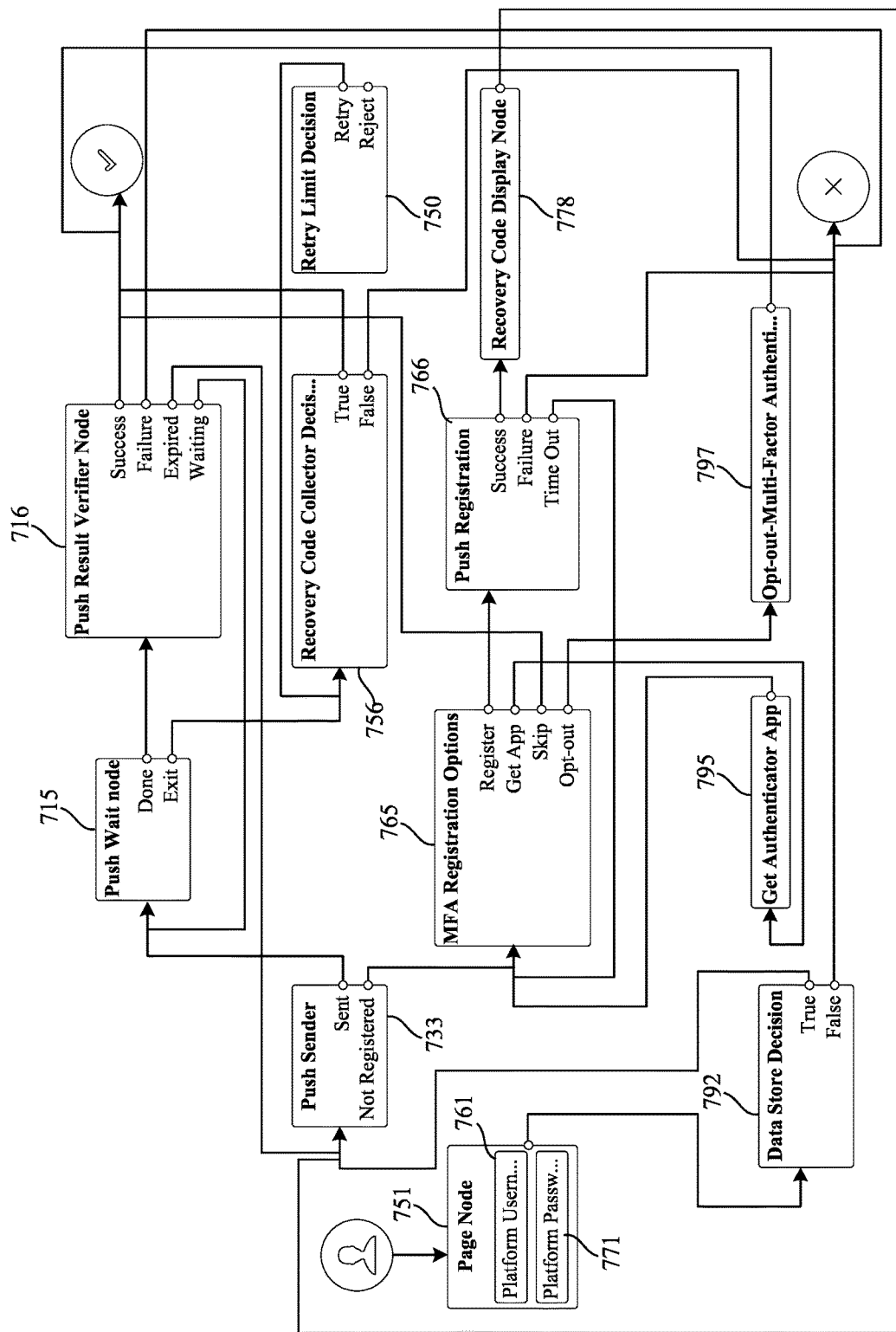
FIG. 7 illustrates a journey tree created in ForgeRock™ Access Manager, visually representing an authentication journey.

Inner tree node 226 takes the input, whether received directly from decision node 224 or MFA node 225, and routes the request through parts of MFA Authentication Journey 205. The routing can depend, at least in part, on the received input. For example, if the request was routed to MFA node 225, the route taken within inner tree node 226 can depend, in part, on whether MFA had succeeded or failed. Inner tree node 226 is a node that can itself comprise a complex set of authentication tree nodes. FIG. 7, described later, shows an example journey tree that represents an authentication journey.

The outcome determines the response to the request, and post-journey response is not a focus of this disclosure. In this example, once the request has been routed through inner tree node 226, the outcome is either success node 218 or failure node 238.

Result node 229 provides, to a prediction service, authentication journey event data. Autonomous Access 275 uses the authentication data, as part of a training dataset, to train machine learning models. The authentication journey event data can include the request, the context, the route of the journey, the actions taken by the user during the journey, whether a step-up challenge was provided to the user, and the outcome of the journey. More examples of feature categories that can be sent to Autonomous Access 275 by result node 229 include metadata regarding the authentication journey, the metadata about the request, transactions that occurred during the authentication journey or at the conclusion of the journey, and the results of such transactions. Even more features will be apparent to those skilled in the art.

Result node 229 can also record userIDs and explanations as part of a step-up event log. The step-up event log is an information source that stores data regarding recently tendered and successfully completed step-up challenges (in this example, the step-up event log stores data regarding MFA challenges) associated with the userID, as well as the explanation of why step-up was invoked, in one implementation. The step-up event log can be used by decision node 224 when determining whether to route the request to MFA node 225 or whether to route, via connector 215, to inner tree node 226. The step-up event log can be stored locally or on the cloud, can be tunable as to a specific time span and can be a standalone implementation (e.g., a text logfile) or part of a larger schema of information (e.g., a relational database). Next, we describe the features of Autonomous Access 275, which hosts the access prediction service, in more detail.

FIG. 2C illustrates features 200c of Autonomous Access 275. Autonomous Access 275, introduced above with respect to FIG. 2A, includes access prediction service 285, training set 287 and ML models 295.

Access prediction service 285 is the service interface though which Autonomous Access 275 receives features of authentication requests. Once access prediction service 285 receives features from signal node 223, access prediction service provides those features to ML models 295 and receives a risk score.

Access prediction service 285 also provides feedback MFA authentication journey 205. The feedback provided by access prediction service 285 includes the risk score. The risk score can be based on a combination of the ML model risk sub-score and a heuristic risk sub-score based on the results of one or more heuristic rules. The feedback can also include an explanation of the risk score. The explanation indicates a feature that was anomalous. Examples of explanations include unusual city, unusual OS version, unusual browser family, other features received from signal node 223 when those features are part of an unusual context for the userID. The explanation can also or instead indicate that a heuristic for improper activity was met. The heuristic rules can involve, but are not limited to, Automated User Agent, Brute Force, Credential Stuffing, Impossible Traveler, and Suspicious IP. More details about the example heuristic rules are provided below in reference to FIG. 4.

In further enhancements, collected journey results can be used for supervised learning. Access prediction service 285 receives journey event data from result node 229. The journey event data is labeled with the outcome of the journey (success or failure). Access prediction service 285 initiates an Extract-Transform-Load (ETL) process with training set 287 to create a ground truth labeled data set.

Training set 287 stores a history of journey event data from multiple login attempts. In implementations, training set 287 can be limited to a single customer network. Alternatively, training set 287 can be multiple customer networks.

Retraining can be triggered in a number of ways. At certain retraining triggers (which can be a period of time, when an error rate is reached, when a false-positive threshold is reached, or other situations where the accuracy of the model falls into question), training set 287 provides the stored features to ML Models 295 for retraining. Periods of time for retraining can be up to two weeks. Periods shorter than two weeks are also contemplated where specific models have the property of training quickly.

Although the example contemplates individual models that make up ML models 295 as each having their own individual retraining period, implementations of the technology with a global retraining period of the models fall within the span of this disclosure.

ML models 295 contains at least a variety of unsupervised machine learning models. Unsupervised ML models can include (but are not limited to) encoder-decoder architecture models such as AutoEncoders (AE), Variational AutoEncoders (VAE); and clustering models such as k-modes clustering. Once trained, Autonomous Access 275 uses the ML models in a production environment. The characteristics of several models are described below, in reference to FIGS. 3A, B.

In further enhancements, ML models 295 also include one or more supervised and/or semi-supervised learning models. The supervised and/or semi-supervised learning models can be trained, at least in part, from data received from result node 229 that is labeled with at least which of terminal node(s) 217 was reached.

Each ML model of ML models 295 provides a risk sub-score based on features received by action prediction service 285. In this example, the encoder-decoder model sub-scores are combined into an encoder-decoder sub-score, the score from the k-modes clustering algorithm is a clustering sub-score. The encoder-decoder model sub-scores a cluster sub-score are the basis of an ML model sub-score.

ML models 295 can be retrained periodically or by trigger. ML models 295 retrieve training data from training set 287 once retraining occurs. Next, we present the combined features of the MLA authentication journey 205 and Autonomous Access 275 together in a combined landscape.

Figure 2D:
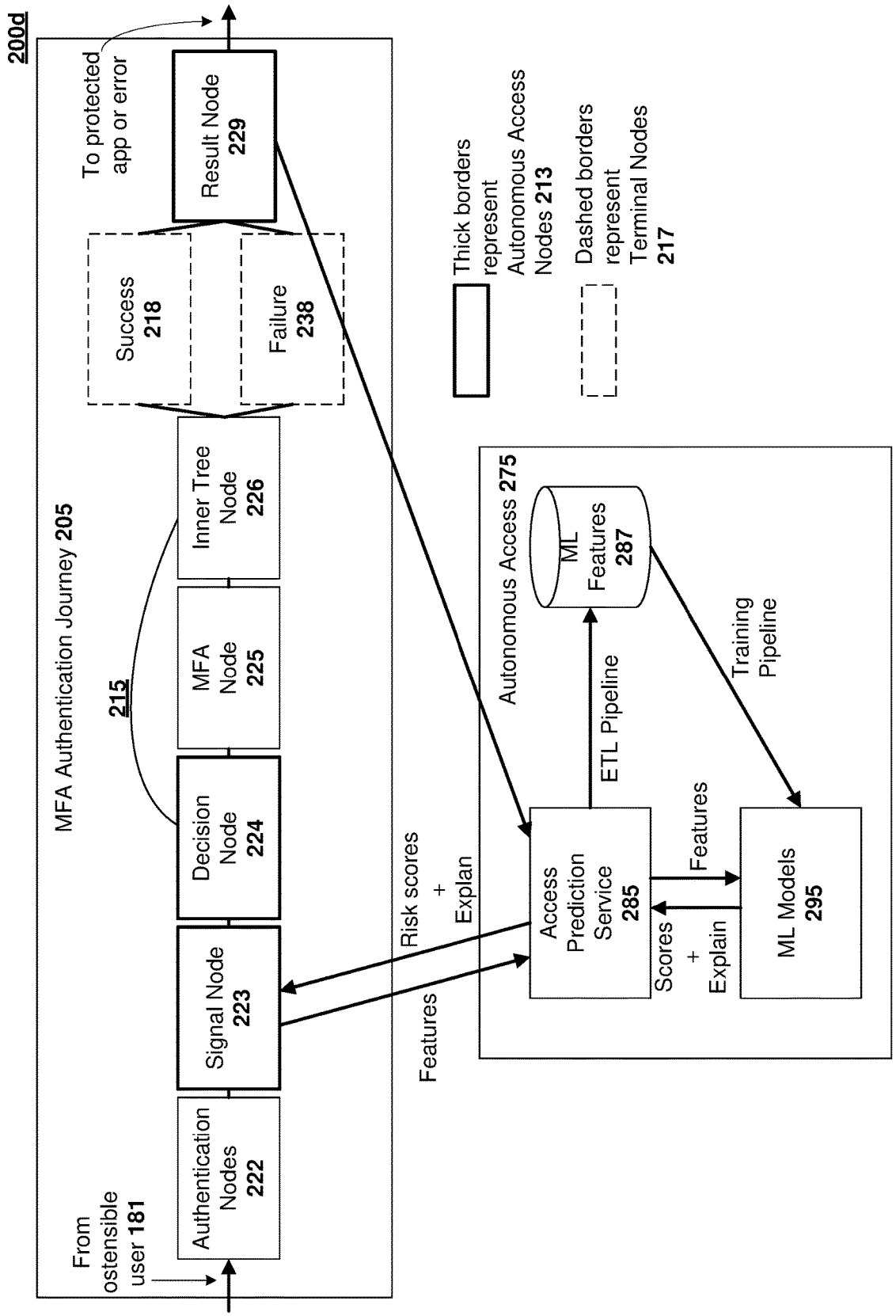
FIG. 2D illustrates a combined block diagram of an example MFA authentication journey with ForgeRock™ Autonomous Access.

FIG. 2D illustrates a combined landscape 200d of example MFA authentication journey 205 with ForgeRock™ Autonomous Access 275. Ostensible user 181 (who might or might not be a valid user) requests authentication, MFA authentication journey 205 processes the request, and either permits access without step-up authentication or issues a step-up challenge for authentication. Landscape 200d includes the elements previously presented in FIGS. 2B and 2C. As such, a list setting forth each element and some specific description of that element is omitted here for brevity.

Landscape 200d illustrates an interaction between Autonomous Access nodes 213 in MFA Authentication Journey 205, and access prediction service 285 in Autonomous Access 275, via signal node 223.

In further enhancements, landscape 200d illustrates an interaction via result node 229, in which Autonomous Access 275 uses the result of a completed MFA authentication journey 205 for training supervised models. Next, we present example machine learning models used by access prediction service 285 to predict anomalies, starting with an Autoencoder.

FIG. 3A illustrates an autoencoder diagram 300a that includes input sequence 342, encoder 344, decoder 346, output sequence 348 and latent space 355. AutoEncoders (AE) use an encoder-decoder architecture with two main building blocks. Encoder 344 encodes input sequence 342 into latent space 355, which is a fixed sized vector. The context vector representing latent space 355 is then passed as input to the second building block, decoder 346. Decoder 346 generates an output sequence, conditioned on the input.

The encoder-decoder model is optimized end-to-end by using backpropagation, a method of training a neural network in which the initial system output is compared to the desired output and the system is adjusted until the difference is minimized. In backpropagation, encoder 344 is trained to extract information from the input sequence, decoder 346 is trained to capture underlying structural organization and the data itself. This results in a fluent model that uses context and generalizes well. Output sequence 348 is used to train the model to prevent mistakes from stacking. The previously predicted output value is used to predict the next output value.

The information about the input sequence is forced into latent space 355. Because the latent space is a fixed sized vector, this forces the encoder-decoder architecture to learn the aspects of the features that are general to the problem and thereby avoid overfitting.

An AE is a particular kind of encoder-decoder in which the neural network is trained with the goal of the input and output converging. The difference between the input and output layers is called the "reconstruction loss" error. During training, the AE uses the reconstruction loss error to determine how to adjust the weights of neural network edges. During production, to determine anomaly, the AE uses the reconstruction loss error from the production environment input to determine whether an anomaly has occurred by using the reconstruction loss error to generate a risk score (or as used herein, the AE risk sub-score). The decoder layer attempts to recreate the features of the input. The decoder layer is expected to be able to recreate features based on the earlier training of the AE and generate the reconstruction loss error in situations which the authentication request matches one of usual authentication request patterns. Libraries that implement AE include the "TensorFlow" Python package and "Gensim." An implementation of this technology used TensorFlow version 2.7.0 and Gensim 3.8.3. Other libraries can be used in another implementation of the disclosed technology. Next, we present a Variational AutoEncoder.

FIG. 3B illustrates a Variational AutoEncoder (VAE) 300b usable for anomaly detection. VAE 300b is example of an "autoEncoder" encoder-decoder model which optimizes an approximation of the posterior (which could be intractable) using a Variational Bayes approach. VAE 300b includes embedded authentication request features X, encoder $q(z|x)$, latent space Z, mean $\mu$, variance $\sigma$, decoder $p(x|z)$, reconstruction loss layer 359.

Bayesian inference is a class of techniques that update probability of a hypothesis as more evidence becomes available. A marginal likelihood is a distribution of observed data, represented as a likelihood function that is integrated over the space of the possible parameter values that could define a particular mathematical model. Sometimes, the marginal likelihood function includes an integral that is intractable. Variational Bayesian methods are a family of Bayesian techniques for approximating intractable integrals, such as Expectation Maximation (EM), or mean-field approximation. Sometimes, EM and mean-field algorithms also cannot be used.

VAE 300b can be used when the marginal likelihood function is intractable and known workarounds to the marginal likelihood function are also intractable. Detailed discussion of VAE can be found in "Auto-Encoding Variational Bayes," (herein "Kingma") which is incorporated by reference in its entirety herein. The following discussion is overview of VAE based on Kingma and the figure includes many reference characters similar to symbols used in Kingma. Authentication request features are embedded into n dimensions using fastText embedding to obtained embedded authentication request features x. In one example, n is one hundred. In other examples, n can be set to other values and this adjustment can affect training speed and/or model accuracy. Encoder $q(z|x)$ uses embedded authentication request features x as input and predicts mean u and variance o of the logarithmic distribution in latent space for each feature. Since the marginal likelihood function may be intractable, VAE 300b approaches this problem by recognition model q(z|x) where z is an unknown distribution and x are discrete variables in that distribution. The recognition model, encoder q(z|x), has the role of the encoder model of in an AE. Decoder p(x|z) samples from the latent space distributions, based on mean u and variance o and generates a vector representing latent space Z. In the instant example, VAE 300b performs sampling with Gaussian sampling because authentication request features are continuous data. In some implementations, VAE 300b may also be used with the Bernoulli distribution when features are binary. Decoder p(x|z) attempts to recreate the input based on these samples.

Continuing the description of VAE 300b, the difference between the input and output is the reconstruction loss, which is determined by reconstruction loss layer 359. During training, the reconstruction loss is used to adjust the parameters using the "reparameterization trick" during back propagation. During production, the reconstruction loss is used to estimate anomaly and contributes to the risk score. Libraries used to implement VAE 300b are "TensorFlow" Python package and "Gensim." An implementation of this technology used TensorFlow version 2.7.0 and Gensim 3.8.3. In other implementations, other libraries can be used. Next, we present k-mode clustering, starting with a table of user characteristics, for explaining how the clusters are created.

FIG. 3C illustrates Initial Cluster Assignment for Authentication Request Events usable to explain k-mode clustering. Table 300c shows example authentication requests corresponding to access by a distinct user in a network.

K-modes clustering uses a simple matching dissimilarity measure (i.e., the distance) for categorical objects, uses feature-mode values instead of feature-mean values to determine cluster membership and uses frequency of appearance to find the modes of attributes. The set of modal feature values of a cluster, used to measure distance relative to the features of authentication request, is called a "cluster-mode" herein. "Extensions to the k-Means Algorithm for Clustering Large Data Sets with Categorical Values," which is incorporated by reference herein in its entirety, describes k-modes clustering was first published as an extension to k-means clustering to cluster categorical data.

Table 300c includes event 310, a column of identifiers introduced for purposes of this disclosure to facilitate discussion of particular rows in the table. Each event in event 310 represents an authentication request by distinct users, characterized by a feature set of 4 feature values. The next four columns correspond to features country 311, city 312, device 313 and OS 314. The list of features is not exhaustive, but the discussion is limited to four features for brevity. The next three columns, distance to cluster 0 cluster-mode 315, distance to cluster 1 cluster-mode 316 and distance to cluster 2 cluster-mode 317 provide the quantitative difference in feature values (aka "distance") for each event compared to feature values for each initial cluster-mode. The final column, initial assignment 318, sets forth the initial cluster assignment of each event, based on the closest distance.

The k-mode clustering process (1) establishes initial cluster-modes, (2) finds the distance between each event and the cluster-modes, and assigns the cluster based on the closest distance, and (3) reevaluates each cluster-mode by using the mode-average of feature values on a feature-by-feature basis. The k-modes process randomly selects k distinct events and designates the feature values of the event to establish initial cluster-modes. Table 300c designates these events as initial cluster-modes by displaying those events in boldface 322. In another implementation, feature values are stored in descending order of appearance frequency, as described by "Extensions to the k-Means Algorithm for Clustering Large Data Sets with Categorical Values," which is incorporated by reference herein.

The k-modes algorithm tallies the differences between each event's feature values and cluster-mode, and uses the tally as the distance for each event. Put another away, k-modes finds the Hamming distance of an event to a cluster's cluster-mode. A Hamming distance is the number of changes needed to change one set of features to another. Using event nine of table 300c as an example, if an authentication request has features of <Country: USA, City: New York Device: Mac, OS: MacOS> and a cluster-mode of a cluster has the values of <Country: USA, City: New York City, Device: iPhone, OS: Windows 7>, then the Hamming distance is two because the features values of the feature "Device" and the feature "OS" are different. Using event one of table 300c as an example: distance to cluster zero cluster-mode 315: zero (because each attribute is identical); distance to cluster one cluster-mode 316: one (because cluster city Miami is different than access event city 312 Alexandria); distance to cluster two cluster-mode 317: two (because the country 311 and city 312 attributes are both different than the cluster country and cluster city). Using event two of table 300c as a comparison to event one, distance to cluster zero cluster-mode 315 is one (because access event city 312 Miami is different than cluster city Alexandria); distance to cluster one cluster-mode 316: zero (because all attributes in the event are identical to the attributes in cluster one); distance to cluster two cluster-mode 317 is two (because access event county 311 is different than cluster country Belarus and access event city 312 is different than cluster country Minsk). The result is that event two is assigned to cluster one. Using event three of table 300c as a comparison to events, the distance to cluster zero cluster-mode 315 is four (because every feature is different than that of the cluster-mode), the distance to cluster one cluster-mode 316 is four (because every feature is different than that of the cluster-mode), the distance to cluster two cluster-mode 317 is four (because every feature is different than that of the cluster-mode). For event three, there is a tie for closest cluster. In this situation, the cluster is randomly assigned among the closest clusters. To simplify this example explanation, the events with ties are assigned to cluster zero. Once each event has its tally for each cluster, each event is assigned to a cluster by using the minimum tally. Continuing the above example using events one through three, event one is assigned to cluster zero because the tally of differences in features is zero. Event two is assigned to cluster one because the tally of differences in features is zero. In circumstances in which there is a tie in distance between two clusters, the event is assigned to an arbitrary cluster amongst the set of minimum tally clusters. Event three is equally close to each of cluster zero through two, so event three is assigned to a cluster randomly selected amongst clusters zero through two.

In FIG. 3C, initial assignment 318 records the cluster to which respective event 310 is initially assigned. As shown in initial assignment 318, cluster zero includes events zero, one, three, five, nine and ten; cluster one includes events two, four and eight; and cluster two includes events six and seven. Once each event is assigned to a cluster, each cluster reevaluates the cluster-mode. A cluster's cluster-mode is determined on an attribute-by-attribute basis using the most frequently occurring feature value (i.e., the "mode" average) of that particular attribute. For cluster 0, the cluster-mode is: USA, Alexandria, PC, Win-11. For cluster one, the cluster-mode is: USA, Miami, PC, Win-11. For cluster two, the cluster-mode is: Belarus, Barysaw, PC, Win-11. If the algorithm encounters a tie for highest frequency value, the algorithm arbitrarily selects amongst the tied values for the cluster-mode feature. For example, cluster two in this example has only two members that differ by city, Minsk and Barysaw. The cluster-mode "city" feature for cluster 2 is randomly selected from Minsk and Barysaw. The events are reassigned to the closest distance cluster, based on the cluster-mode update for each cluster. A cycle of reevaluating cluster-mode then reassigning the events to a cluster based on the lowest tally, is called an epoch. The k-mode training continues to perform epochs until either cluster membership converges (i.e., no cluster membership changes between epochs), or a threshold number of epochs is reached. Once either condition is satisfied, the k-modes model is trained. Next, a table that illustrates how the trained k-modes model detects anomaly is presented.

FIG. 3D illustrates Authentication Request Events for a Particular UserID usable to explain how k-modes can detect anomaly. Table 300*d* includes event 321, country 322, city 323, device 324, OS 325, explain 1 326, explain 2 327, k-mode risk sub-score 328. Event 321 is a column of identifiers introduced in this disclosure to facilitate discussion particular rows in the table. The rest of the data in the table is real data from real access events to a real user account. Country 322, city 333, device 324 and OS 325 are several attributes used in anomaly detection. The list of attributes is kept short for the sake of brevity in explanation and does not imply that the list constitutes the complete set of attributes used to detect anomalies. Examples of other attributes that could also be used along with the features discussed here were presented earlier with respect to FIG. 2B. Explain 1 326 and explain 2 327 are the attributes that were found to contribute most to k-mode risk sub-score 328 of respective event 321.

K-mode risk sub-score 328 measures the anomaly of any particular event 321. K-mode risk sub-score 328 is calculated by (1) finding a set of "good clusters," (2) measuring an edit distance between the features of the authentication request and cluster-modes good clusters, (3) and determining the risk score by the risk score formula, based on the tallies/Hamming distance.

Finding a set of "good clusters" involves finding the set of clusters that are representative of the user's past behavior. An example process usable to find a set of "good clusters" involves determining the userID appearance ratio, which is the frequency of a userID appearing in a cluster over the frequency of a userID appearing in the training set. The userID appearance ratio is then be compared against a userID appearance threshold. If the userID appearance ratio exceeds the threshold, the cluster can be considered a confident cluster. In some implementations, the default userID appearance threshold is 0.1. The userID appearance threshold is adjustable, so may be set to a value other than 0.1.

If the number of confident clusters meets or exceeds a good cluster threshold, then the set of good clusters is the set of confident clusters. If the number of confident clusters falls below a good cluster threshold, then the set of good clusters is all of the clusters. Either way, the k-modes process finds the set of good clusters.

Continuing the example, for each cluster mode in the set of good clusters, the algorithm measures the tally of differences (aka Hamming distance) between the authentication request features and the cluster-mode features. The closest distance and furthest distance are recorded.

Determining the risk score is the last step. Furthering the earlier example, the risk score could be calculated as $$100\left(\frac{\text{closest } dist}{\text{furthest } dist}\right)^2.$$

Turning back to the example data in FIG. 3D, access attempts from Porto Alegre, in southern Brazil, are the most frequently appearing in the table (events 1, 2, 4-7, 11-13). Some other low risk events (events 8-10) attempt access from Joinville, which is approximately 300 miles away from Porto Alegre. In table 300*d*, run of the mill and low anomaly events used Macintosh computers running Mac OS X. One event was a high risk event (event 3), from Madrid, Spain, using an unknown device running Windows, and bolded in FIG. 3D to show it was flagged as an anomalous event.

For each event, a k-mode risk sub-score 328 was measured based on the risk score equation. Since cluster-mode features are not guaranteed to match every feature of a user's typical authentication requests, even when access to customer endpoints is usually from Porto Allegre, the risk score might exceed zero because the closest distance cluster-mode can have some different features. For example, events 1 and 2 have a higher risk score than events 8, 9. In other words, if the features of the access attempts from Joinville happen to be closer to the cluster-mode than Porto Alegre, the Joinville risk scores can be lower than those from Porto Alegre even if the userID typically accesses customer endpoints from Porto Alegre. From the perspective of an access prediction service, as long as the risk sub-score does not exceed the risk threshold, neither set of authentication requests are flagged as anomalous.

Some K-mode risk sub-score 328 values in table 300*d* differ despite the fact that the values in country 322, city 323, device 324 and OS 325 are identical across those events (e.g., compare events 1, 5). As explained earlier, the attributes provided in the table are simplified for purposes of illustration and other attributes that are not listed in the table can also influence the value of K-mode risk sub-score 328. Thus, attributes such as time of day (unshown) and day of week (unshown) could also impact the distance to the cluster-mode.

One library for implementing k-modes is the python package "kmodes." An implementation of this technology used kmodes version 0.11.1. Other libraries can be used in another implementation of the disclosed technology.

In further enhancements, the machine learning models can include supervised and/or semi-supervised learning models, trained on labeled data based on authentication journey event data. The models can be trained on data labeled by which of terminal node 217 were reached by the authentication journey, the data also including a variety of feature categories that can include (and are not limited to) authentication request features (such as city, dayparting, device, etc.), journey features (such as features of the authentication journey itself, including which nodes were visited, etc.), third-party features (such as results from security software from other vendors, or legacy systems that are required to successfully complete processing the user authentication request so that a user account can be correctly provisioned by downstream systems). Next, rule-based heuristics that can signal anomaly are presented.

FIG. 4. illustrates a block diagram of several example rule-based heuristics that can signal anomaly. Diagram 400 includes authentication attempt features 411 and rule-based heuristics 419. Authentication attempt features 411 can include userID 421 and features from one or more previous authentication attempts, such as IP address 431, timestamp 451, geographic location 471 and metadata surrounding the session that led to the request (aka "session data") 491. Rule-based heuristics 419 can include Suspicious IP 429, Impossible Traveler 439, Credential Stuffing 459, Brute Force 479 and Automated User Agent 499. With respect to authentication attempt features 411, some features can be found in the authentication request packet header (such as source IP address 431) or payload (such as userID 421). Some features can be determined as metadata added to the request by authentication request processing components. The metadata can include direct data about the request itself (such as timestamp 451 which records when the request was received) or can be data derived from information contained within the request packet (such as geographic location 471 derived using IP geolocation techniques from source IP address 431). Some features can be determined from the session data 491 (which can include referrals, dwell time, user activity such as mouse movements during the session, negative activity such as lack of interaction with GUI widgets on a landing webpage, etc.) We describe the rule-based heuristics 419 next.

Suspicious IP 429 determines if an IP address has multiple access attempts within a limited period of time. For example, if an IP address attempts to access the network 10 times within a minute, Suspicious IP 429 can return a high score. Suspicious IP 429 uses features including IP source address 431 and timestamp 451.

Impossible Traveler 439 determines if a login pattern indicates impossible travel between a user's current and last login. For example, if a user logs in from an IP address geolocated from Washington DC and, in the next hour, logs in from an IP address geolocated in Seoul, South Korea, then the user would have had to travel over 6,900 miles per hour for both login attempts to be from the authentic user. Impossible Traveler 439 can return a high score in such circumstances. Impossible Traveler 439 can use features including userID 421, geographic location 471, and timestamp 451.

Credential Stuffing 459 determines if the same IP address is used amongst a threshold number of users. For example, if the same off premises IP address is used amongst 50 distinct users attempting to log into a network within five minutes, Credential Stuffing 459 can return a high score. Credential Stuffing 459 uses features including userID 421, source IP address 431, and timestamp 451.

Brute Force 479 determines if multiple, failed, login attempts are being made against the same userID. For example, if over 5 failed login attempts have occurred in the last fifteen minutes, then Brute Force 479 can return a high score. Brute Force 479 uses features including userID 421, timestamp 451.

Automated User Agent 499 determines if the client is a bot. There is a variety of evidence that can be used indicate that the client is a bot, including (but not limited to):

Unfamiliar referral traffic from a small number of sites.
Unusual bounce rates.
Unusual interactions with visual elements (including lack of interaction).
Unusual geographic locations driving spikes in traffic.
Unusually low time spent on navigating page.
Unusual timing of events per page.
Unusually high frequency of visits from an IP address.
Indication of bot in user agent string.

Automated user agent 499 uses features including userID 421, IP Address 431, timestamp 451, Geographic location 471 and session data 491.

Next, we address how various types of risk sub-scores from disparate approaches, such as cluster models, autoencoders and rule-based heuristics, are combined in an ensemble to produce the risk score.

FIG. 5A and FIG. 5B list example code for an ensemble approach to obtaining a risk score that combines autoencoding models, clustering models and rule-based heuristics. Source code 500a includes heuristic risk sub-score aggregation process 510, encoder-decoder risk score aggregation process 520, cluster model risk sub-score 530, model risk sub-score aggregation process 540 and risk sub-score aggregation process 550. The score-based ensemble evaluation illustrates the way various scores can be assembled in order to provide a risk score that is based on multiple types of risk analysis. Certain types of risk analysis will carry specific strengths and, if one type of risk analysis suggests a high risk, then the authentication journey can be alerted to the risk.

Heuristic risk score aggregation process 510 performs a max function on a heuristic score array that stores the risk sub-scores from each individual rule-based heuristic. In other words, if the Credential Stuffing score is ninety and the Automated User Agents score is eight-seven, heuristic risk sub-score aggregation process 510 returns a heuristic risk sub-score of ninety.

Encoder-decoder risk score aggregation process 520 performs a mean-average function on the risk sub-scores returned by the encoder-decoder models. Because we use two encoder-decoder models (namely, the AE and VAE) in this example, the encoder-decoder risk sub-score is the sum of both models divided by two.

The example demonstrates that the ensemble permits a single model to represent some types of models (as in, the k-modes model represents the clustering risk sub-score). In ensemble implementations that employ more than one cluster model, a cluster risk score aggregation process would be applied to the risk scores by the hypothetical more-than-one cluster models to obtain cluster model risk score 530. A different example can provide a separate process to aggregate cluster model risk scores.

Model risk score aggregation process 540 performs a max function on the result of encoder-decoder risk score aggregation process 520 and the cluster model risk score 530. In implementations in which more than one cluster model is used, the ensemble can use the result of the cluster model risk score aggregation process.

Risk score aggregation process 550 performs a max function on the result of model heuristic risk sub-score aggregation process 510 and model risk score aggregation process 540. The result of risk score aggregation process 550 can be reported to the authentication journey as part of feedback, and can be used to evaluate a risk level (e.g., "low," "moderate," "high") that is reported to the authentication journey as part of feedback.

Although the example specifies particular aggregation processes of mean-average and max, other manners of aggregation are contemplated and would be understood by those skilled in the art as within the ambit of this disclosure.

In general, when model training is necessary, the types of analysis employed in the ensemble support training by unlabeled data. As a further enhancement, the ensemble can also use supervised and/or semi-supervised learning models in addition to rule-based heuristics and unsupervised learning models. The supervised and/or semi-supervised learning models are be trained on labeled data obtained from result node 229.

A risk sub-score from any particular heuristic rule or model can be scaled or capped. For example, if a VAE ML model value exceeds a mean by three standard deviations, the risk sub-score can be set to one hundred, representing certainty that the authentication request is anomalous.

FIG. 5B continues the code example list for the ensemble approach to obtaining the risk score that combines autoencoding models, clustering models and rule-based heuristics. Source code 500b illustrates storing risk score and risk sub-scores in a risk_score_data structure. And shows risky event flag setter 560 and risky event flag storage 570. Risky event flag setter 560 flags the authentication request as a risky event if the risk score exceeds a risk score threshold as true or false. Risky event flag setter 570 also stores the flag value in the risk score data structure.

Figure 5C:
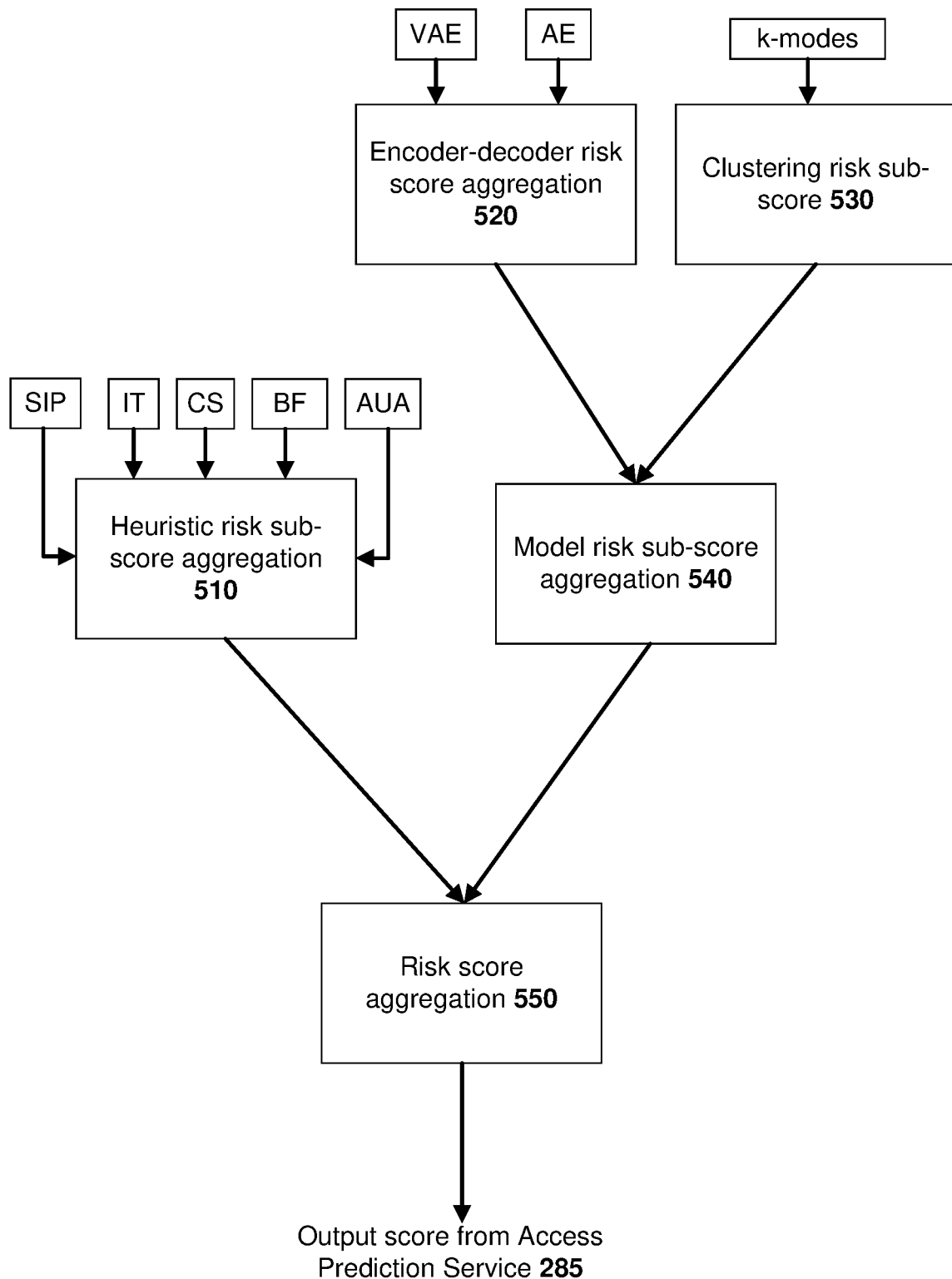
FIG. 5C illustrates a flow diagram showing how the source code calculates the risk score from the various risk sub-scores.

FIG. 5C illustrates a flow diagram showing how the source code 500 calculates the risk score from the various risk sub-scores. Heuristic risk score aggregation 510 uses the highest risk sub-score of any of the heuristics. Encoder-decoder risk score aggregation 520 uses the mean average of an autoencoder risk sub-score and variational autoencoder risk sub-score. Clustering risk score 530 obtains the k-modes cluster risk sub-score. Model risk score 540 is the maximum of encoder-decoder risk score aggregation 520 and clustering risk score 530. Risk score aggregation 550 is the max of heuristic risk sub-score aggregation 510 and model risk score 540. The output of risk score aggregation 550 is the risk score that is sent to signal node 223 from access prediction service 285. We describe the accuracy and precision of the models using receiver operating characteristic (ROC) curves next.

ROC curves plot the true positive rate (TPR) as a function of the false positive rate (FPR) at various threshold settings. Precision Recall (PR) curves allow the viewer to see the relationship between the precision (the number of true positives over the total number of positives) and the recall (number of true positives over the total number of real true values). For each of the curves we describe next, a "threshold" defines the boundary between no risk and risk. For example, if a threshold is set to 85, then a that is under 85 is treated as no anomaly, and a score above 85 is treated as having an anomaly. A False Positive Rate (FPR) is the rate that the model identified events as anomalous when the authentication request was not anomalous. A True Positive Rate (TPR) is the rate that the model identified events as anomalous when the authentication request was anomalous. A Positive Predictive Value (PPV) is the number of true positive predictions over the number of all positive predictions, and measures the likelihood that a model return an indication of anomaly is correct. Area Under Curve is a metric that evaluates the quality of the model, with 0.5 being blind guessing.

Figure 6A:
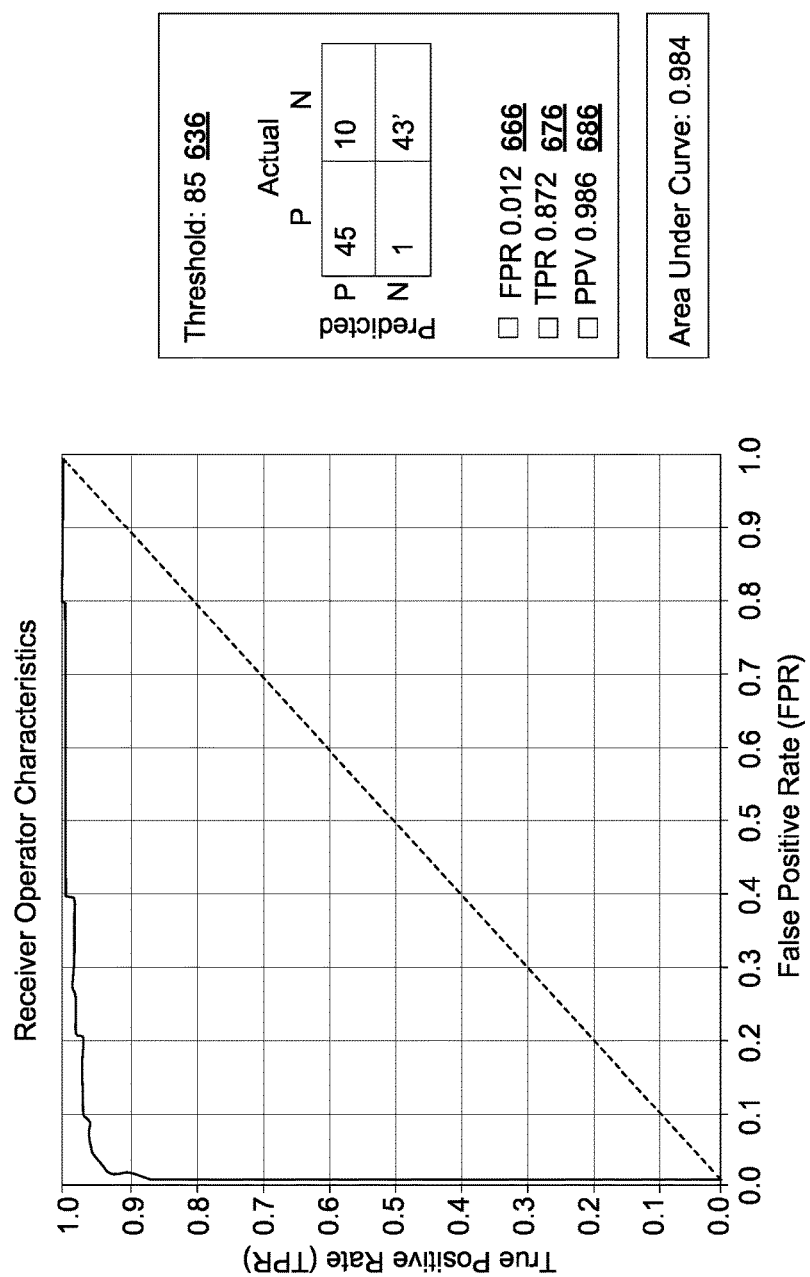
FIG. 6A illustrates the Receiver Operating Characteristic of an ensemble.
Figure 6B:
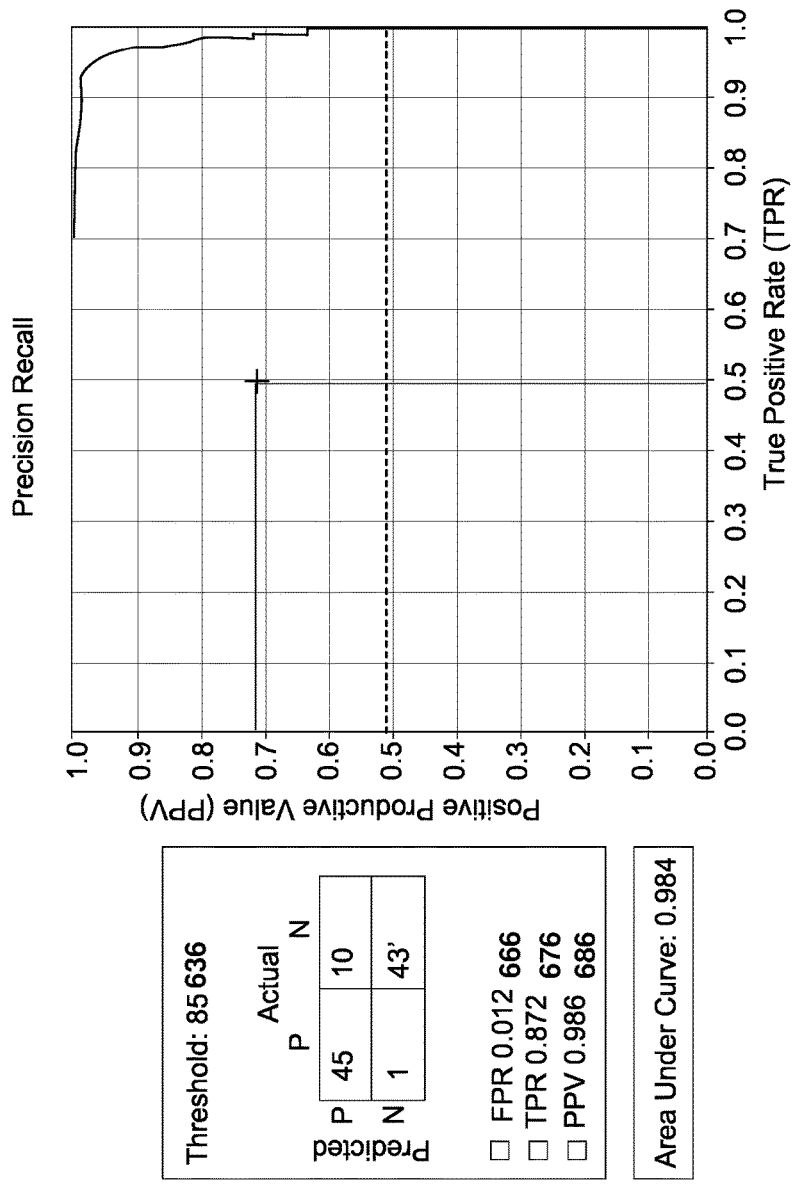
FIG. 6B illustrates the Precision Recall of an ensemble.

FIG. 6A illustrates the Receiver Operating Characteristic of an ensemble. FIG. 6B illustrates the Precision Recall of an ensemble. The ROC curve in diagram 600a and PR curve in diagram 600b were produced from the ensemble of models. Both of curves 600a, 600b include threshold 636, FPR 666, TPR 676, and PPV 686. For the ensemble of models with threshold 636 of 18, FPR 666 is 0.012, TPR 676 is 0.872, and PPV 686 is 0.986.

Figure 6C:
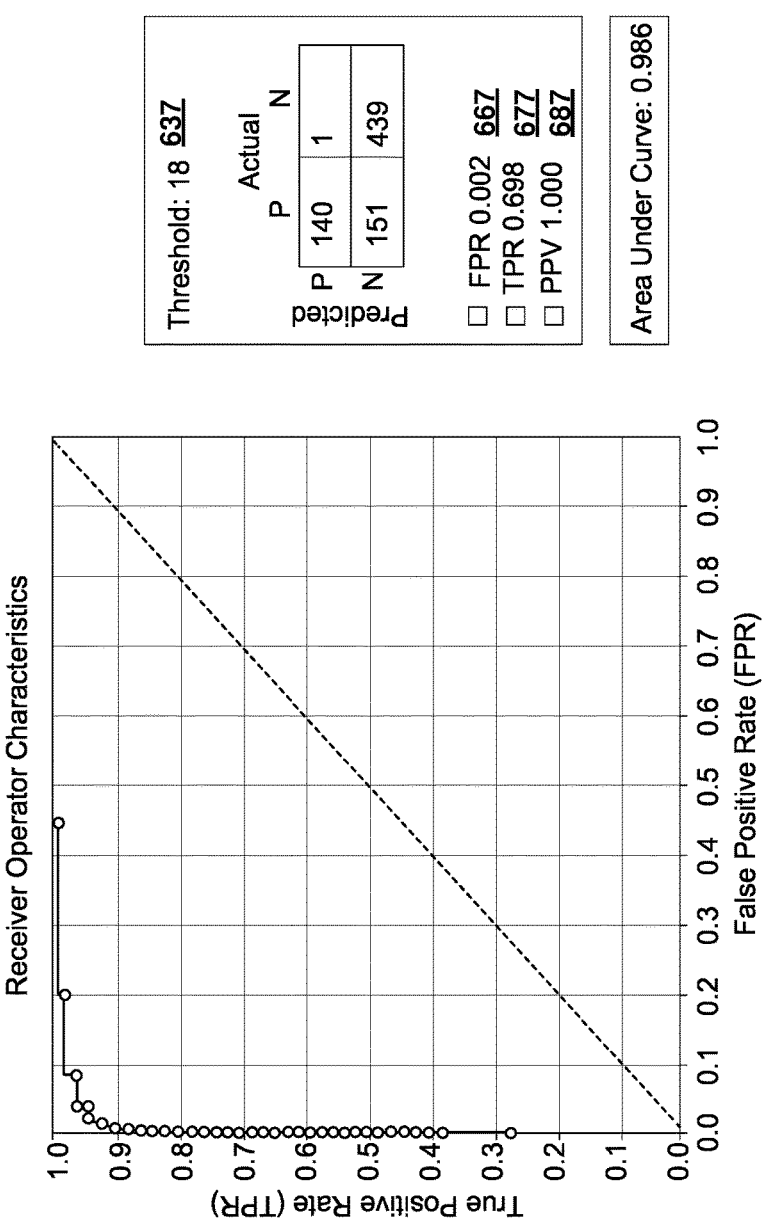
FIG. 6C illustrates the Receiver Operating Characteristic of Autoencoder.
Figure 6D:
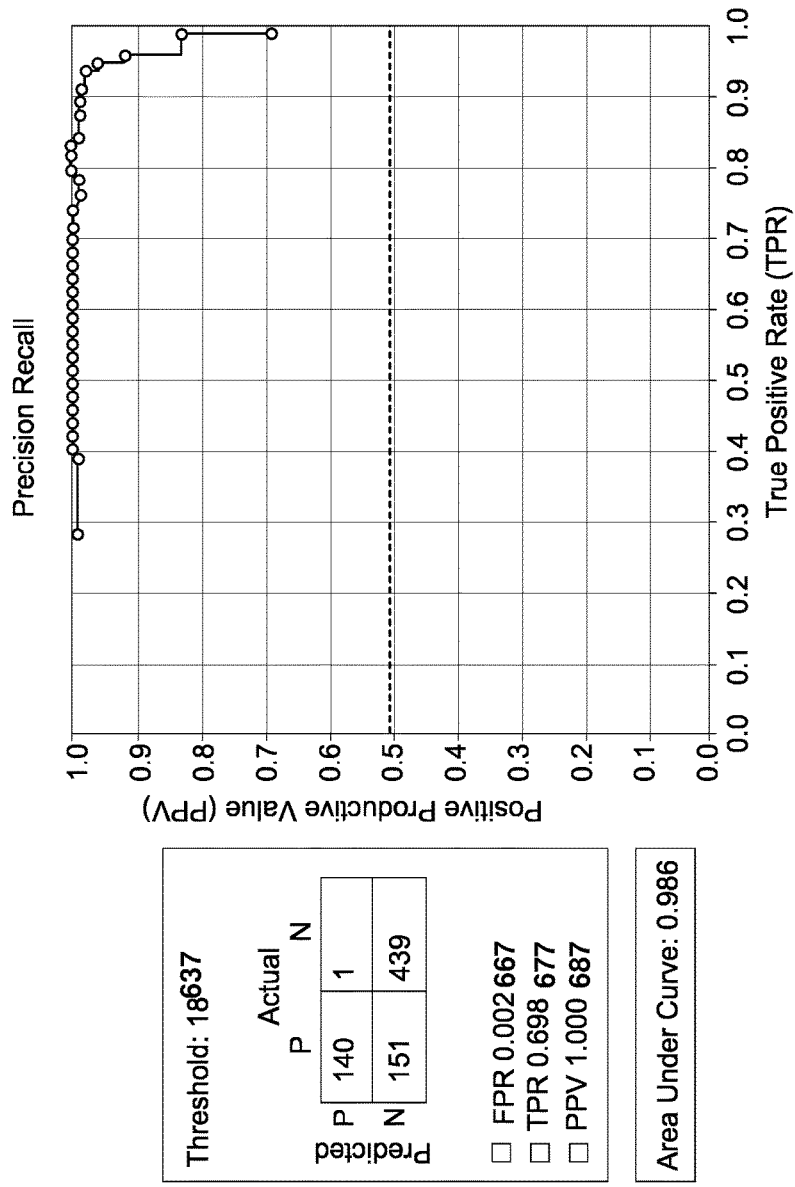
FIG. 6D illustrates Precision Recall of an Autoencoder.

FIG. 6C illustrates the Receiver Operating Characteristic of Autoencoder and FIG. 6D illustrates Precision Recall of an Autoencoder. The ROC curve in diagram 600c and PR curve in diagram 600d were produced from the AE model. Both of curves 600c, 600d include threshold 637, FPR 667, TPR 677, and PPV 687. For the AE model with threshold 637 of 18, FPR 667 is 0.002, TPR 677 is 0.698, and PPV 687 is 1.0.

Figure 6E:
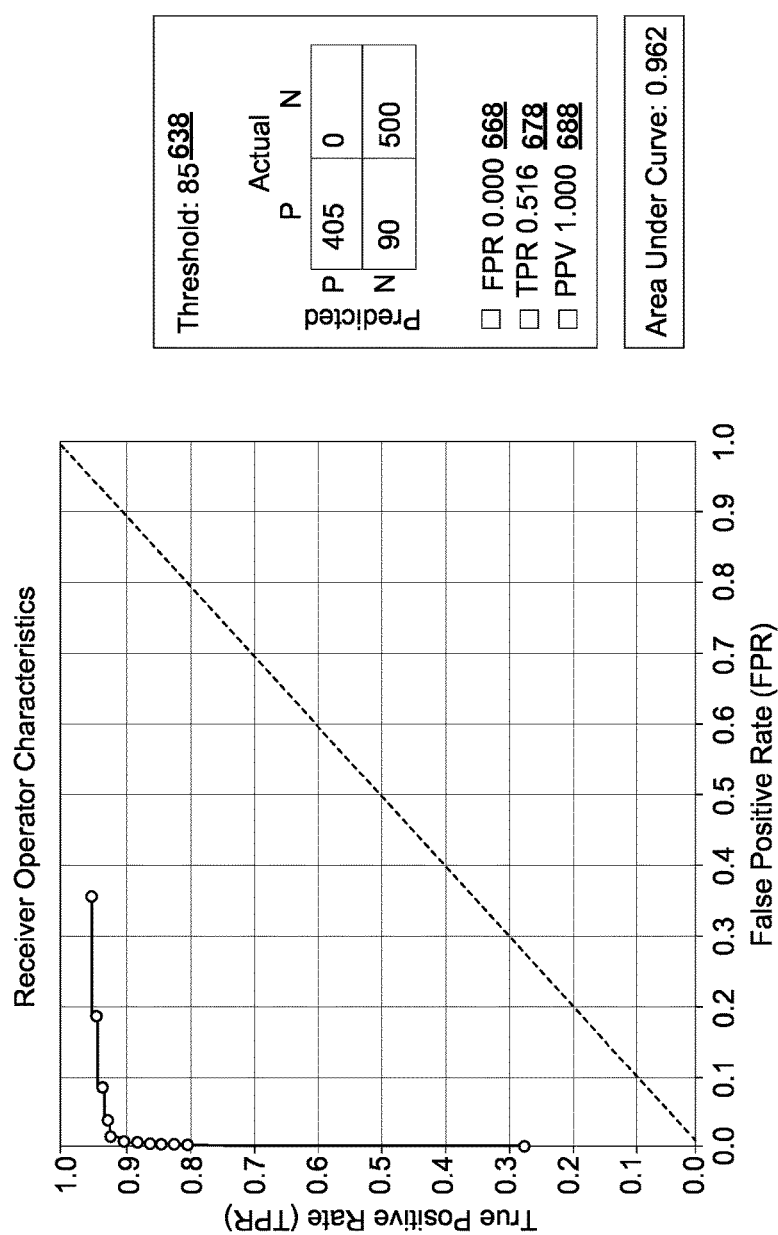
FIG. 6E illustrates the Receiver Operating Characteristic of Variational Autoencoder.
Figure 6F:
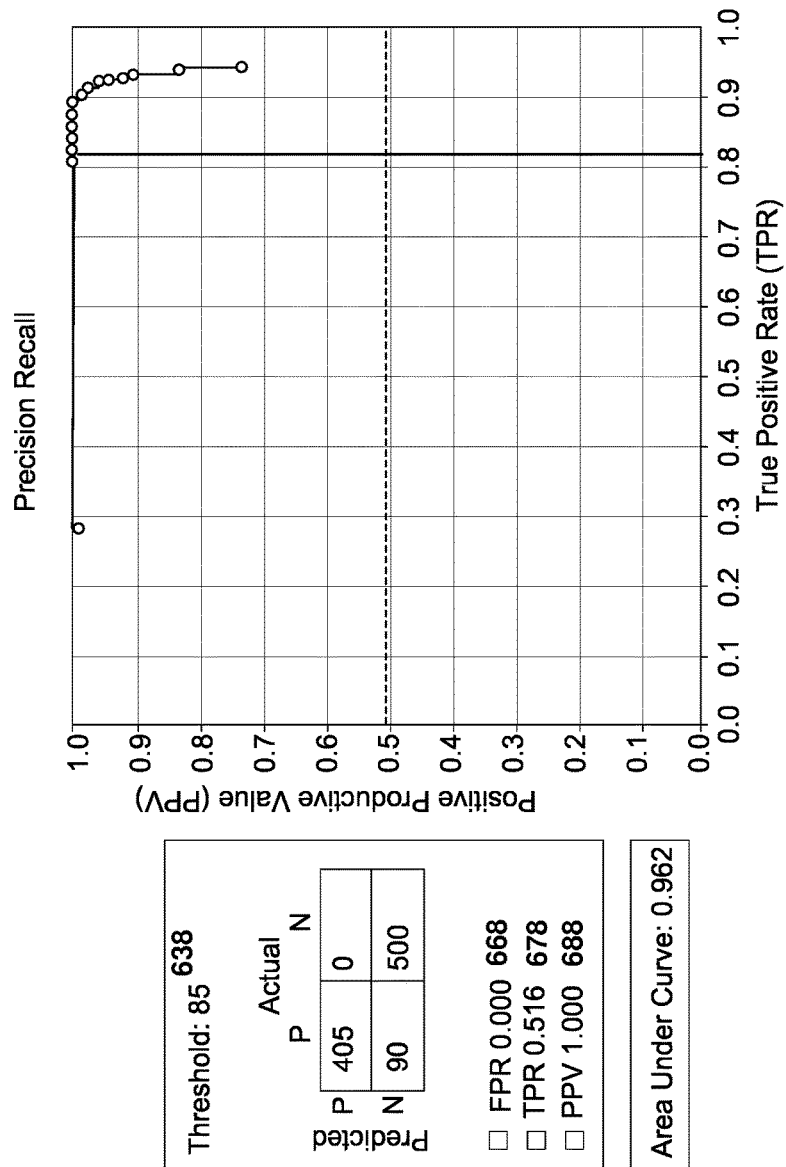
FIG. 6F illustrates the Precision Recall of Variational Autoencoder Variational Autoencoder.

FIG. 6E illustrates the Receiver Operating Characteristic of Variational Autoencoder and FIG. 6F illustrates the Precision Recall of Variational Autoencoder Variational Autoencoder. The ROC curve in diagram 600e and PR curve in diagram 600f were produced from the VAE model. Both of curves 600e, 600f include threshold 638, FPR 668, TPR 678, and PPV 688. For the VAE model with threshold 638 of 85, FPR 668 is 0.000, TPR 678 is 0.516, and PPV 686 is 1.0.

Figure 6G:
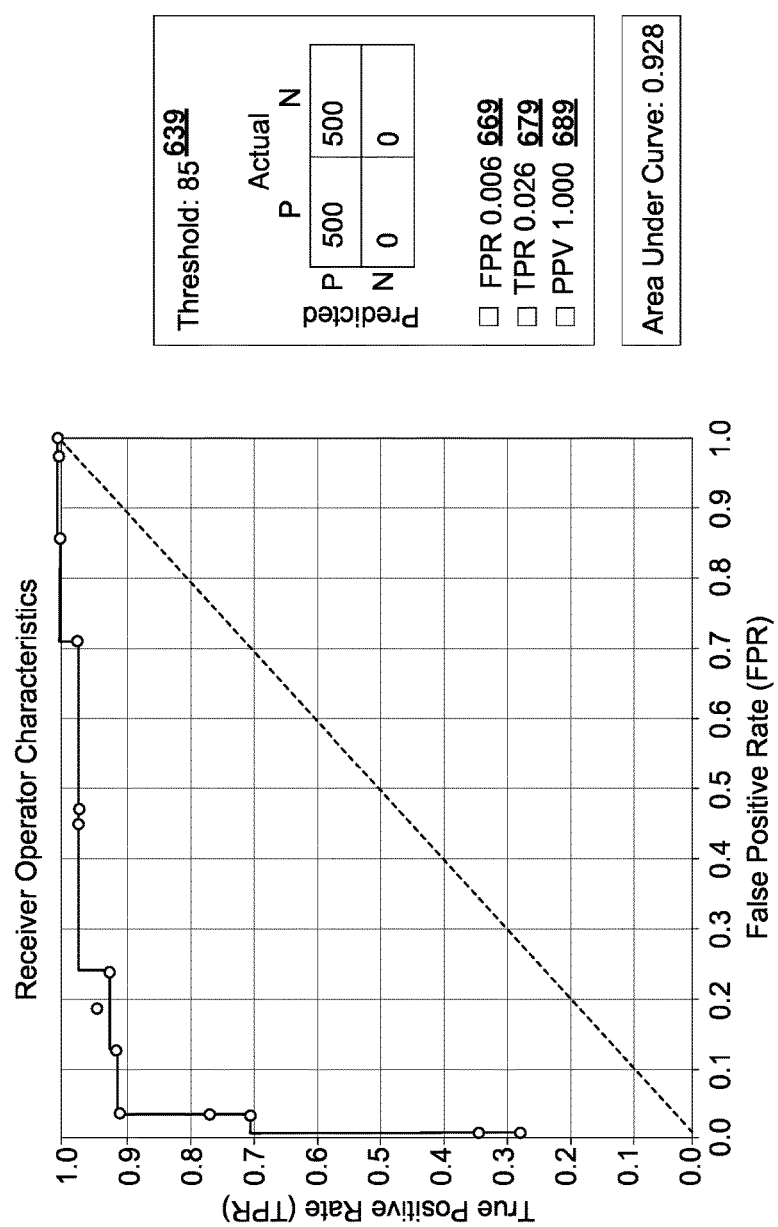
FIG. 6G illustrates the Receiver Operating Characteristic of K-mode clustering model.
Figure 6H:
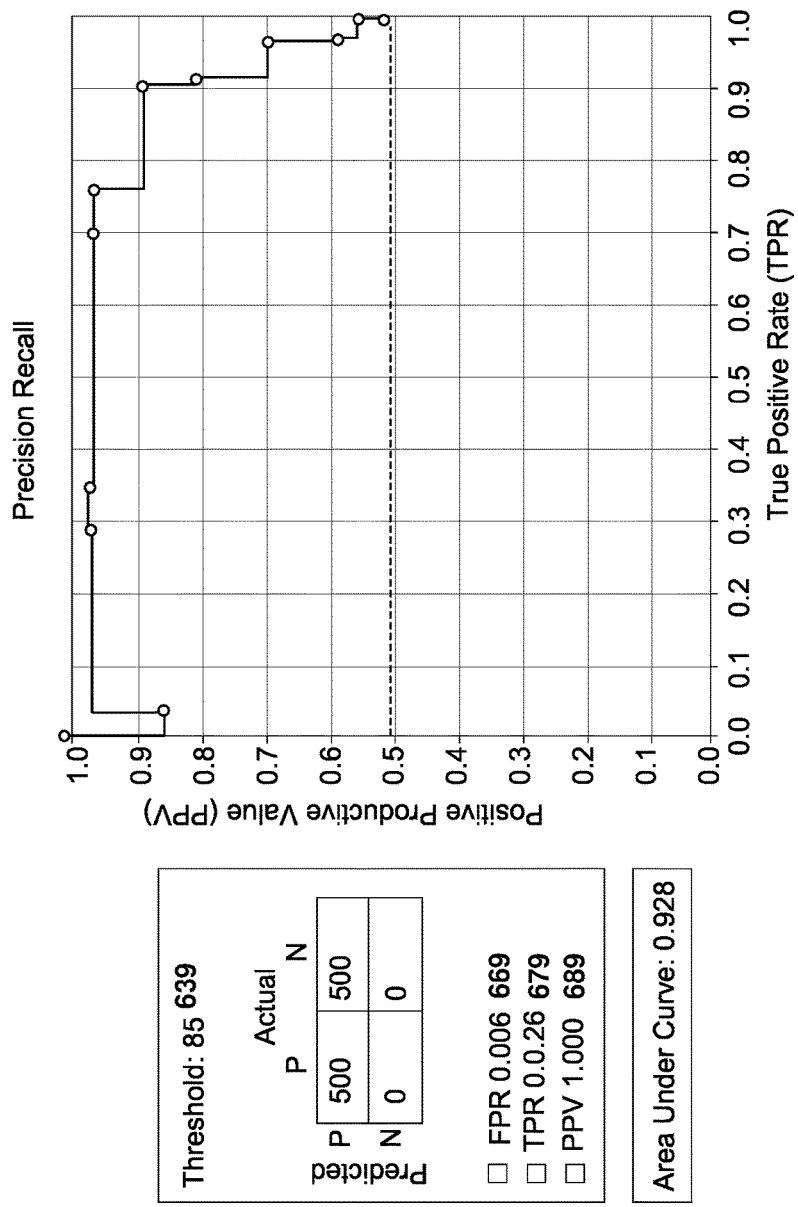
FIG. 6H illustrates the Precision Recall of Variational K-mode clustering.

FIG. 6G illustrates the Receiver Operating Characteristic of K-mode clustering model and FIG. 6H illustrates the Precision Recall of Variational K-mode clustering. The ROC curve 600g and PR curve in 600h were produced by the k-modes model. Both of curves 600g, 600h include threshold 639, FPR 669, TPR 679, and PPV 689. For the k-modes model with threshold 639 of 85, FPR 669 is 0.006, TPR 679 is 0.026, and PPV 686 is 1.0.

Both the set of ROC curves and the set of PR curves permit those having skill in the art to balance security and performance. Those desiring to avoid raising alarms about user access attempts can train a classifier to decrease false positives. When data security is paramount, clients can specify training the classifier to be more sensitive to anomalies. Next, we present a visual representation of an authentication journey, created by ForgeRock™ Access Manager.

FIG. 7 illustrates a journey tree created in ForgeRock™ Access Manager, visually representing an authentication journey. The journey tree, which models an authentication journey, is presented for convenience to the reader for observing the benefit of explainable risk scores for routing in complex authentication journeys and otherwise provide information for the details of MFA. Authentication journey tree 700, includes Page node 751, Platform Username node 761, Platform Password node 771, Data Store Decision node 792, Push Sender node 733, Push Wait node 715, Push Result Verifier node 716, Recovery Code Collector Decision node 756, Retry Limit Decision node 759, MFA Registration Options node 765, Push Registration node 766, Recovery Code Display node 778, Get Authenticator App node 795 and Opt-out Multi-Factor Authentication node 797.

Authentication journey tree 700 is a journey tree that supports authentication if the username is registered and permits registration of the user if the user is not present. Page node 751 includes Platform Username Node 761 and Platform Password node 771. Platform Username Node 761 prompts the user to enter their username and stores it in a configurable state attribute. Platform Password node 771 prompts the user to enter their password and stores the input in a configurable state attribute. Data store decision node 792 verifies that the username and password values match those in the data store configured for the realm. Push sender node 733 sends push notification messages to a device for multi-factor authentication. To determine whether the user has a registered device, the flow includes the username in the shared state, for example, by using a Platform Username node. Push Wait node 715 pauses the authentication for the specified number of seconds during the processing of a push authentication request. Push Result Verifier node 716 works with the Push Sender node to validate the user's response to a previously sent push notification message. Recovery Code Collector Decision node 756 lets users authenticate with a recovery code provided when registering a device for multi-factor authentication. If the user loses their registered device, they can use a recovery code as an alternative method for authentication. Retry Limit Decision node 750 permits the specified number of passes through to the "retry" outcome path before continuing evaluation along the "reject" outcome path. MFA Registration Options node 765 lets the user register a multi-factor authentication device or skip the registration process. The node requires the username and the type of MFA device to perform registration; the username can be obtained, for example, by using a Platform Username node. Push Registration node 766 provides a way to register a device, such as a mobile phone for multi-factor authentication using push notifications. The node requires the username for registration to be successful; the username can be obtained, for example, by using a Platform Username node. Recovery Code Display node 778 retrieves generated recovery codes from the transient state and presents them to the user, for safekeeping. The codes can be used to authenticate if a registered device is lost or stolen. Generated recovery codes are inserted into transient state when evaluation continues along the Success outcome path of the MFA nodes configured to generate recovery codes. Connect this node to the Success outcome path to display the codes. In circumstances where no recovery codes are available in transient state, evaluation continues along the only outcome path and nothing is displayed to the user. Get Authenticator App node 795 displays information advising a user to obtain an authenticator application from the Apple App Store or the Google Play Store. Opt-out Multi-Factor Authentication node 797 sets the "skippable" attribute in the user's profile, which lets them skip MFA. The node requires the username of the identity to update and the type of MFA device.

The non-exhaustive list of nodes described above are a sample of the kinds of nodes that are available to be placed in authentication journeys such as MFA authentication journey 205, such as part of inner tree 226, and to demonstrate a sample of authentication journey complexity that can be captured by journey trees.

Risk Score Explanation

Access prediction service generates explanations of risk scores. In some implementations, the explanation is generated when the risk score exceeds a threshold. In other embodiments, the explanation is generated even when the risk score does not exceed a threshold. The access prediction service provides the explanations, when generated, with the risk score. The explanation supports explainability of the risk score by comprising one or more features that provide the greatest input(s) to the risk score. The quantity of features provided can be set a single feature, or can be set a feature quantity higher than one. The number of features, provided as the explanation, can be configured at the access prediction service or as part of the request session from the signal node to the access prediction service.

The explanation is interpretable by both human users and the authentication journey. A human (e.g., by a network administrator) can use the information to understand attack trends or troubleshoot whether the ML is providing accurate assessments; or (e.g., by a user) can use the information to determine why he or she is being asked to undergo step-up authentication. An authentication system can use the information, in conjunction with a history of prior authentication attempts, to assess whether an anomalous authorization request requires step-up authentication should be required of the user, or whether step-up authentication is unnecessary despite the anomalous circumstances of the authorization request.

FIG. 8A through FIG. 8D illustrate JSON code 800*a* that displays explanations of the risk score. Explanation data 831*a* provides high level information about the explanation, including header data, referrer and userID. Tests conducted 851*a* indicates which tests (including rule-based heuristics) were conducted by the access prediction service. In the rare circumstance that a model is unavailable, this information can be used by an authentication journey to weight the final risk score. Prediction results 871*a* reports the threshold used to flag the event as a risky event ("risk_score_threshold"), the ensemble risk score ("risk_score") and risk sub-scores used by the ensemble to determine the risk score ("heuristic_risk_score," "reconstruction_model_risk_score," and "clustering_model_risk_score."). Prediction results 871*a* is an example of the data stored by source code 500*b*, discussed above in FIG. 5B. Heuristic results 815*a* provides the results of the five rule_based heuristics (Automated User Agent, Impossible Traveler, Brute Force, Suspicious IP and Credential Stuffing). The results show no risk when weighted against the rule-based heuristics (although evaluating Impossible Traveler could not be completed since the heuristic had no prior access attempt with which to compare the current event).

FIG. 8B continues the illustration of JSON code 800*b* explaining the risk score. Clustering results 851*b* shows provides results for the clustering models. Again, in the example, only k-mode clustering is used. The section includes a risk sub-score ("risk_score") of 15.755470475720893, the information about predicted cluster that the authentication event for the userID ("predicted_cluster") and the cluster that the authentication event was assigned to ("closest_relevant_cluster_for_user_bin"). Cluster explanation 815*b* explains the cluster result. This section shows the top two scores that contributed to the cluster risk sub-score. Here, that is browser and osWithVersion. While the cluster risk sub-score, in this example, did not indicate anomaly, where the cluster risk sub-score is higher, these scores could be relevant. Encoder-Decoder results 855*b* shows providing the results for ML models AE and VAE, and lists the values of features provided to those models. Autoencoder results 865*b* shows, in this example, the autoencoder risk sub-score ("risk score") is zero.

FIG. 8C further continues the illustration of JSON code 800*c* explaining the risk score. Variational autoencoder results 811*c* show VAE risk sub-score ("risk score") with a value of one hundred for this example set of data. Unlike the other tests, the sub-score for VAE indicates a high risk. Encoder-Decoder explanation 891*c* show "country" as the column name of the feature that contributed most to the encoder-decoder risk sub-score. The encoder-decoder explanation is, in this example, the explanation for the VAE sub-score. In some implementations, the system is configured to provide the explanation for the VAE sub-score, even if the AE sub-score exceeds the VAE sub-score. The access prediction service can be configured to provide more than one explanation and can be configured to provide alternative explanations using alternative analysis. Some implementations also incorporate approaches such as root mean squared error and explanation of same.

FIG. 8D lists JSON code 800*d* that provides the closing elements for the code listed in FIGS. 8A-FIG. 8C, with variables that indicate whether the heuristic tests and anomaly detection were run.

Computer System

Figure 9:
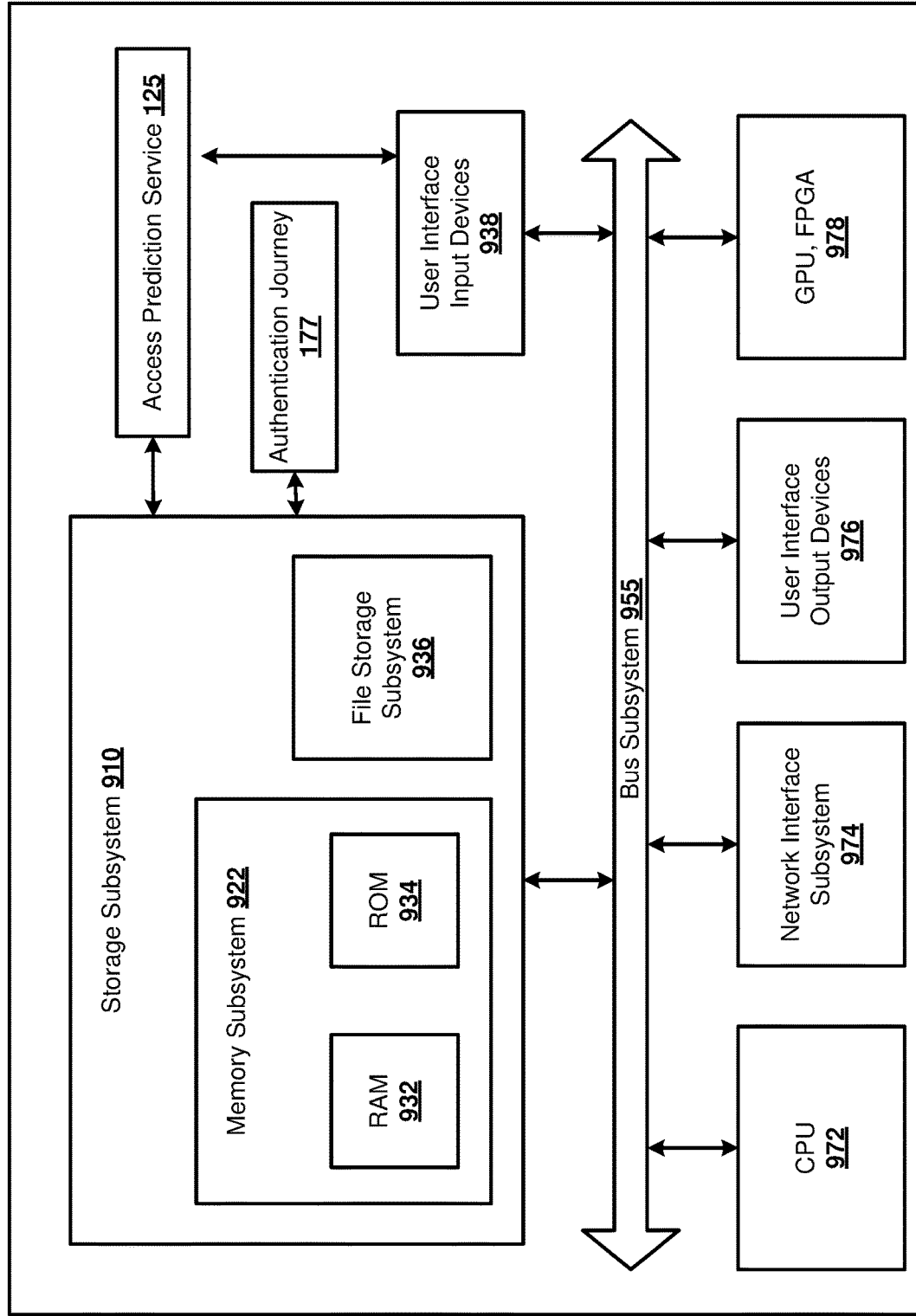
FIG. 9 is a simplified block diagram of a computer system that can be used for conditional invocation of step-up authentication based on anomalous requests during an authentication journey without burdening legitimate users, for detecting anomalous authentication requests to a customer endpoint during an authentication journey and for training ML models based on the features of an authentication journey, without burdening legitimate users, according to one implementation of the disclosed technology.

FIG. 9 is a simplified block diagram of a computer system 900 that can be used for conditional invocation of step-up authentication based on anomalous requests during an authentication journey, without burdening legitimate users. Computer system 400 includes at least one central processing unit (CPU) 972 that communicates with a number of peripheral devices via bus subsystem 955, access prediction service 125 and authentication journey 177, as described herein. These peripheral devices can include a storage subsystem 910 including, for example, memory devices and a file storage subsystem 936, user interface input devices 938, user interface output devices 976 and a network interface subsystem 974. The input and output devices allow user interaction with computer system 900. Network interface subsystem 974 provides an interface to outside networks, including an interface to corresponding interface devices in other computer systems. Access prediction service 125 and authentication journey 177 is communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include the possible types of devices and ways to output information from computer system 900 to the user or to another machine or computer system.

Storage subsystem 910 stores programming and data constructs that provide the functionality of the of the modules and methods described herein. Subsystem 978 can be graphics processing units (GPUs) or field-programmable gate arrays (FPGAs).

Memory subsystem 922 used in the storage subsystem 910 can include a number of memories including a main random-access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, a DVD drive, a Blu-ray drive, an optical drive, or removable media cartridges. The modules implementing the functionality of certain implementations can be stored by file storage subsystem 936 in the storage subsystem 410, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or fewer components than the computer system depicted in FIG. 9.

Some Particular Implementations

We describe various implementations for conditional invocation of step-up authentication based on anomalous requests during an authentication journey, without burdening legitimate users.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed includes authentication request, ostensibly from a user, to an access prediction service. The method implementation also includes receiving feedback from an access prediction service, the feedback comprising a risk score and an explanation of the risk score. The implementation includes finding, based on the risk score, that the authentication request is anomalous. The implementation also includes based on the finding that the authentication request is anomalous, and explanation, determining whether to invoke step-up authentication.

Other implementations may include a non-transitory computer readable storage medium storing instructions executable by a processor to perform a method as described above. Yet another implementation may include a system including memory and one or more processors operable to execute instructions, stored in the memory, to perform a method as described above.

For some further implementations, the sending includes a userID of the user, and the finding is that the authentication request is anomalous for the user.

For some further implementations, the determining does not invoke step-up authentication, whereby the user is not challenged despite the finding of anomaly. Still further implementations comparing the explanation in the feedback to a previous explanation of a previously invoked step-up authentication challenge made to the user, wherein the previously invoked step-up authentication challenge was completed successfully, and finding that the explanation matches the previous explanation.

For some further implementations, the determining invokes step-up authentication. Still further implementation further include attempting to compare the explanation in the feedback with a previous explanation of a previously invoked step-up authentication challenge made to the user, wherein the previously invoked step-up authentication challenge was completed successfully, and finding no previous explanation is available. Still further implementations further include comparing the explanation in the feedback to one or more previous explanations of one or more previously invoked step-up authentication challenges made to the user, wherein the one or more previously invoked step-up authentication challenge were completed successfully, and finding that the explanation is mismatched with each of the previous explanations. Still further implementations include the one or more previously invoked step-up authentication challenges were made within a month of the authentication request, or a biweek of the authentication request, or a week of the authentication request.

In some implementations, the step-up authentication comprises one or more of Multi-factor Authentication (MFA), Two-factor Authentication (2FA), Completely Automated Public Turing test to tell Computers and Humans Apart (CAPTCHA), a biometric, and repeating a security code sent to a physical device possessed by the user.

Computer readable media (CRM) implementations of the technology disclosed include a non-transitory computer readable storage medium impressed with computer program instructions, when executed on a processor, implement the methods described above.

Each of the features discussed in this particular implementation section for the first system implementation apply equally to the CRM implementation. As indicated above, all the system features are not repeated here and should be considered repeated by reference.

We describe various implementations for detecting anomalous authentication requests to a protected resource during an authentication journey, in order to conditionally invoke step-up authentication without burdening legitimate users.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed includes obtaining request features from the authentication request that triggered the authentication journey. The implementation also includes processing, by an ensemble of Machine Learning (ML) models and a set of rule-based heuristics, a set of features based on the request features, the set of features associated with a userID. The implementation also includes deriving risk sub-scores for each ML model and each heuristic. The implementation also includes deriving a risk score based on the risk sub-scores. The implementation also includes providing, to a node in the authentication journey, the risk score.

Other implementations may include a non-transitory computer readable storage medium storing instructions executable by a processor to perform a method as described above. Yet another implementation may include a system including memory and one or more processors operable to execute instructions, stored in the memory, to perform a method as described above.

For some implementations, the ensemble of ML models comprise unsupervised learning models, including at least one clustering model and at least one encoder-decoder model that both generate a risk sub-score and further includes generating an explanation of at least one risk sub-score. In still further implementations, the at least one encoder-decoder model includes at least a variational auto-encoder (VAE), and the generated explanation includes an explanation for the VAE risk sub-score. In still further implementations, the at least one encoder-decoder model includes at least an autoencoder (AE), and the generated explanation includes an explanation for the AE risk sub-score.

For some implementations, the at least one clustering model includes a k-mode model, each cluster member of the k-mode model represents a distinct userID, and a cluster risk sub-score based on a set of request features compared to the k-mode cluster-mode.

For some implementations, the rule-based heuristics include at least 1 of: Impossible traveler, Credential stuffing, Brute force, Suspicious IP, and Automated User Agent (aka bot). In even further implementations, the rule-based heuristics include at least 2 of the heuristics, at least 3 of the heuristics, at least 4 of the heuristics, or all 5 of the heuristics.

Further implementations include the set of features also includes 1 or more of: geographical country from which the request originated, geographical city from which the request originated, device type from which the request originated, day of week on which the request was received, part of day in which the request was received, OS type from which the request was sent, user agent from which the request was sent. In even further implementations, the set of features can include at least 3 of the features, at least 4 of the features, at least 5 of the features, at least 6 features, or at least all 7 features.

In many implementations, the request features include categorical data.

In some implementations, the ML models are hosted in the cloud. In other implementations, the ML models are hosted in the same local area network as the servers that manage the authentication journey.

In some implementations, the risk-sub-scores from the ML models are assembled into a cluster sub-score, and an encoder-decoder sub-score, the risk sub-scores from the heuristics are assembled into a heuristic sub-score, and the cluster sub-score, encoder-decoder sub-score and heuristic sub-score are assembled into the risk score. In further implementations, the method further includes assembling the heuristic sub-score comprises obtaining each sub-score generated by each respective heuristic responsive to the obtained authentication request, and applying the maximum amongst each sub-score generated by each respective heuristic as the heuristic sub-score. In further implementations, the method includes assembling the encoder-decoder sub-score comprises obtaining each risk sub-score generated by each respective encoder-decoder model; and taking an average of each risk sub-score generated by each respective encoder-decoder model as an encoder-decoder risk sub-score. In further implementations, the average is a mean average. In further implementations, the method further includes applying the maximum of the cluster and encoder-decoder risk sub-score as an ML model risk sub-score. In further implementations, the risk score is the maximum of the heuristic risk sub-score and ML model risk sub-score.

Computer readable media (CRM) implementations of the technology disclosed include a non-transitory computer readable storage medium impressed with computer program instructions, when executed on a processor, implement the methods described above.

Each of the features discussed in this particular implementation section for the first system implementation apply equally to the CRM implementation. As indicated above, all the system features are not repeated here and should be considered repeated by reference.

We describe various implementations for building a training set and performing supervised training of a Machine Learning (ML) model that determines risk scores used to decide whether to impose stepped up authentication during an authentication journey The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed includes selecting examples of completed authentication journeys, including failed and successful authentication outcomes after step-up requirements during the example journeys. The implementation also includes pairing ground truth outcomes from the example journeys with request features initially available prior to imposition of the step-up requirements to produce request feature-outcome pairs. The implementation also includes using at least the request feature-outcome pairs to perform the supervised training of the ML model to determine a risk score that can be used to decide whether to impose the stepped up authentication during an authentication journey.

Other implementations may include a non-transitory computer readable storage medium storing instructions executable by a processor to perform a method as described above. Yet another implementation may include a system including memory and one or more processors operable to execute instructions, stored in the memory, to perform a method as described above. Some implementations further include receiving fresh authentication request features, processing, with the trained ML model, the fresh authentication request features, and providing a risk score generated by the trained ML model. Further implementations further include providing an explanation of the model when the risk score exceeds a threshold, wherein the explanation comprises a feature that contributed most to a finding of anomaly.

For some implementations, the request features used when training the ML model include 5 or more of: geographical country from which the authentication request originated, geographical city from which the authentication request originated, device type from which the authentication request originated, day of week on which the authentication request was received, part of date in which the authentication request was received, OS type from which the authentication request was sent, and user agent from which the authentication request was sent.

For some implementations, the ML model training uses journey features as training features. In further implementations, the journey features includes type of step-up authentication as one or more features. In even further implementations, the type of step-up is at least one of multi-factor authentication, CAPTCHA, and biometrics.

For some implementations, the ML model training uses third-party features. In further implementations, the third-party feature is a result from third-party security software.

We claim as follows:

1. A method for detecting anomalous authentication requests to a customer endpoint during an authentication journey, in order to conditionally invoke step-up authentication, the method comprising:
    obtaining request features from an authentication request that triggered the authentication journey;
    processing, by an ensemble of Machine Learning (ML) models and a set of rule-based heuristics, a set of features based on the request features, the set of features associated with a userID, the ensemble of ML models comprising unsupervised learning models including at least one k-mode clustering model and at least one encoder-decoder model, each cluster member of the at least one k-mode clustering model representing a distinct userID;
    deriving a risk sub-score for each ML model from the ensemble of ML models and each heuristic from the set of rule-based heuristics, the risk sub-score for the at least one k-mode clustering model being based on a set of request features compared to a k-mode cluster-mode of the at least one k-mode clustering model;
    generating an explanation of at least one risk sub-score;
    deriving a risk score based on the risk sub-score for each ML model from the ensemble of ML models and each heuristic from the set of rule-based heuristics;
    determining that the risk score exceeds an explanation-triggering threshold; and
    providing, to a node in the authentication journey, the risk score with an explanation of the risk score,
    whereby the risk score and the explanation can be used to determine whether to invoke step-up authentication.

2. The method of claim 1, wherein the at least one encoder-decoder model includes at least a variational autoencoder (VAE), and the explanation of the at least one risk sub-score includes an explanation for the risk sub-score of the VAE.

3. The method of claim 1, wherein the set of rule-based heuristics includes at least 4 of:
    Impossible traveler,
    Credential stuffing,
    Brute force,
    Suspicious IP, or
    Automated User Agent (aka bot).

4. The method of claim 1, wherein the set of features includes at least 3 or more request features of:
    geographical country from which the authentication request originated,
    geographical city from which the authentication request originated,
    device type from which the authentication request originated,
    day of week on which the authentication request was received,
    part of day in which the authentication request was received,
    OS type from which the authentication request was sent, or
    user agent from which the authentication request was sent.

5. The method of claim 4, wherein the set of features includes at least 5 or more of the request features.

6. A non-transitory computer-readable medium configured with instructions to detect anomalous authentication requests to a protected resource during an authentication journey in order to conditionally invoke step-up authentication, the instructions, when executed, implement a method comprising:

obtaining request features from an authentication request that triggered the authentication journey;

processing, by an ensemble of Machine Learning (ML) models and a set of rule-based heuristics, a set of features based on the request features, the set of features associated with a userID, the ensemble of ML models comprising unsupervised learning models including at least one k-mode clustering model and at least one encoder-decoder model, each cluster member of the at least one k-mode clustering model representing a distinct userID;

deriving a risk sub-score for each ML model from the ensemble of ML models and each heuristic from the set of rule-based heuristics, the risk sub-score for the at least one k-mode clustering model being based on a set of request features compared to a k-mode cluster-mode of the at least one k-mode clustering model;

generating an explanation of at least one risk sub-score;

deriving a risk score based on the risk sub-score for each ML model from the ensemble of ML models and each heuristic from the set of rule-based heuristics;

determining that the risk score exceeds an explanation-triggering threshold; and providing, to a node in the authentication journey, the risk score with an explanation of the risk score, whereby the risk score and the explanation can be used to determine whether to invoke step-up authentication.

7. The non-transitory computer-readable medium of claim 6, wherein the at least one encoder-decoder model includes at least a variational autoencoder (VAE), and the explanation of the at least one risk sub-score includes an explanation for the risk sub-score of the VAE.

8. The non-transitory computer-readable medium of claim 6, wherein the set of rule-based heuristics includes at least 4 of:
Impossible traveler,
Credential stuffing,
Brute force,
Suspicious IP, or
Automated User Agent (aka bot).

9. The non-transitory computer-readable medium of claim 6, wherein the set of features includes at least 3 or more request features of:
geographical country from which the authentication request originated,
geographical city from which the authentication request originated,
device type from which the authentication request originated,
day of week on which the authentication request was received,
part of day in which the authentication request was received,
OS type from which the authentication request was sent, or
user agent from which the authentication request was sent.

10. The non-transitory computer-readable medium of claim 9, wherein the set of features includes at least 5 or more of the request features.

11. A system, including a processor operatively connected to a non-transitory computer-readable medium with instructions that, when executed, perform steps of a method for detecting anomalous authentication requests to a protected resource during an authentication journey in order to conditionally invoke step-up authentication, the method comprising:

obtaining request features from an authentication request that triggered the authentication journey;

processing, by an ensemble of Machine Learning (ML) models and a set of rule-based heuristics, a set of features based on the request features, the set of features associated with a userID, the ensemble of ML models comprising unsupervised learning models including at least one k-mode clustering model and at least one encoder-decoder model, each cluster member of the at least one k-mode clustering model representing a distinct userID;

deriving a risk sub-score for each ML model from the ensemble of ML models and each heuristic from the set of rule-based heuristics, the risk sub-score for the at least one k-mode clustering model being based on a set of request features compared to a k-mode cluster-mode of the at least one k-mode clustering model;

generating an explanation of at least one risk sub-score;

deriving a risk score based on the risk sub-score for each ML model from the ensemble of ML models and each heuristic from the set of rule-based heuristics;

determining that the risk score exceeds an explanation-triggering threshold; and providing, to a node in the authentication journey, the risk score with an explanation of the risk score, whereby the risk score and the explanation can be used to determine whether to invoke step-up authentication.

12. The system of claim 11, wherein the at least one encoder-decoder model includes at least a variational autoencoder (VAE), and the explanation of the at least one risk sub-score includes an explanation for the risk sub-score of the VAE.

13. The system of claim 11, wherein the set of rule-based heuristics includes at least 4 of:
Impossible traveler,
Credential stuffing,
Brute force,
Suspicious IP, or
Automated User Agent (aka bot).

14. The system of claim 11, wherein the set of features includes at least 3 or more request features of:
geographical country from which the authentication request originated,
geographical city from which the authentication request originated,
device type from which the authentication request originated,
day of week on which the authentication request was received,
part of day in which the authentication request was received,
OS type from which the authentication request was sent, or
user agent from which the authentication request was sent.

* * * * *